(12) United States Patent
Kobayashi

(10) Patent No.: US 7,230,915 B2
(45) Date of Patent: Jun. 12, 2007

(54) UPPER AND LOWER RELAYS AND NETWORK SYSTEM

(75) Inventor: Naofumi Kobayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 960 days.

(21) Appl. No.: 10/199,904

(22) Filed: Jul. 19, 2002

(65) Prior Publication Data

US 2003/0158964 A1 Aug. 21, 2003

(30) Foreign Application Priority Data

Feb. 15, 2002 (JP) .............................. 2002-039130

(51) Int. Cl.
*G01R 31/08* (2006.01)
(52) U.S. Cl. ........................ 370/226; 370/244; 709/239
(58) Field of Classification Search ................ 370/226, 370/216, 217, 218, 221, 222, 225, 386, 401, 370/404, 408
See application file for complete search history.

(56) References Cited

U.S. PATENT DOCUMENTS

| | | | |
|---|---|---|---|
| 6,621,790 B1 * | 9/2003 | Wils et al. .................. 370/226 |
| 6,910,149 B2 * | 6/2005 | Perloff et al. .................. 714/4 |
| 6,963,575 B1 * | 11/2005 | Sistanizadeh et al. ....... 370/404 |
| 2002/0105692 A1 * | 8/2002 | Lauder et al. .............. 359/124 |
| 2002/0131409 A1 * | 9/2002 | Frank et al. ................ 370/386 |

FOREIGN PATENT DOCUMENTS

| | | |
|---|---|---|
| JP | 11-261620 | 9/1999 |
| JP | 2001-86150 | 3/2001 |

* cited by examiner

*Primary Examiner*—Brian Nguyen
(74) *Attorney, Agent, or Firm*—Katten Muchin Rosenman LLP

(57) ABSTRACT

In a network system comprising an upper relay and a plurality of lower relays connected to the upper relay with working links, the lower relays are connected with redundant links, and communication is performed through the redundant links when the working links are unavailable. Also, frames passing through a same lower relay are distributed and transmitted to the working link and the detour path (working link—lower relay—redundant link).

37 Claims, 17 Drawing Sheets

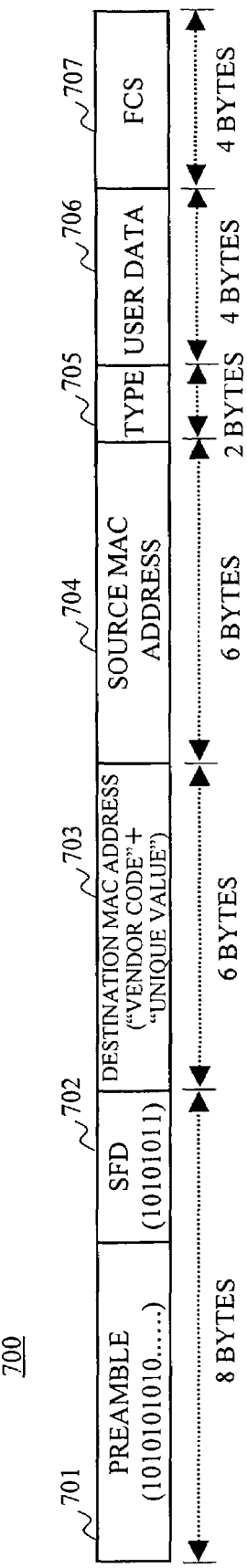

TYPE: "FFF0" = INFORMATION EXCHANGE FRAME

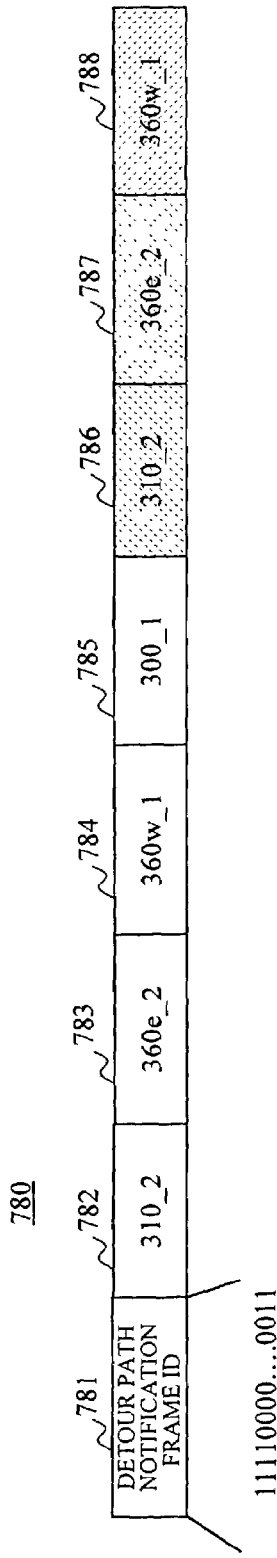

| AGGREGATION SWITCH 200 USUAL LINK TOPOLOGY (PORT ID) | | | |
|---|---|---|---|
| LOWER RELAY | OWN PORT | CONNECT-ED PORT | AVERAGE TRAFFIC LOAD |
| 300_1 | 240_1 | 310_1 | 37% |
| 300_2 | 240_2 | 310_2 | 21% |
| 300_3 | 240_3 | 310_3 | 86% |
| 300_4 | 240_4 | 310_4 | 54% |

271c_2

| REDUNDANT LINK TOPOLOGY (PORT ID) | | CONNECTED RELAY | | | |
|---|---|---|---|---|---|
| | | 300_1 | 300_2 | 300_3 | 300_4 |
| OWN RELAY | 300_1 | — | 360w_1 | × | 360e_1 |
| | 300_2 | 360e_2 | — | 360w_2 | × |
| | 300_3 | × | 360e_3 | — | 360w_3 |
| | 300_4 | 360w_4 | × | 360e_4 | — |

| AGGREGATION SWITCH 200 USUAL LINK TOPOLOGY (PORT ID) | | | |
|---|---|---|---|
| LOWER RELAY | OWN PORT | CONNECT-ED PORT | WORKING LINK BANDWIDTH |
| 300_1 | 240_1 | 310_1 | 100Mbps |
| 300_2 | 240_2 | 310_2 | 100Mbps |
| 300_3 | 240_3 | 310_3 | 100Mbps |
| 300_4 | 240_4 | 310_4 | 1000Mbps |

271d_2

| REDUNDANT LINK TOPOLOGY (PORT ID) | | CONNECTED RELAY | | | |
|---|---|---|---|---|---|
| | | 300_1 | 300_2 | 300_3 | 300_4 |
| OWN RELAY | 300_1 | — | 360w_1 | × | 360e_1 |
| | 300_2 | 360e_2 | — | 360w_2 | × |
| | 300_3 | × | 360e_3 | — | 360w_3 |
| | 300_4 | 360w_4 | × | 360e_4 | — |

271d

UPPER AND LOWER RELAYS AND NETWORK SYSTEM

BACKGROUND OF THE INVENTION

1. Field of the Invention

The present invention relates to upper and lower relays and a network system, and in particular to a network system and relays (upper and lower relaying devices) composing the network system, especially a device such as a LAN switch performing a layer 2 switching.

Recently, a spread of the Internet, an expansion of an enterprise IP (Internet Protocol) network (intranet), a provision of an IP virtual leased line (i.e. IP-VPN (IP Virtual Private Network) service by carriers (Type I carriers) and an ISP (Internet Service Provider), and the like accompanied by a rapid spread of a personal computer have made IP data communication more and more important.

Also, together with functions and performances of a network itself enhanced, various services such as e-mail, WWW (World Wide Web), integration of voice and data over IP (i.e. VoIP (Voice over IP)), and movie/voice reproduction have been spreading, whereby the total volume of data traffic has been increasing.

Correspondingly, a network itself has become broadband (high-speed), and multimedia data of large capacity has come into widespread use. In such a network, its reliability is critical.

2. Description of the Related Art

FIG. 21 shows a basic arrangement of a prior art network which offers such services. This network is layered into a backbone network 120 of a carrier, an access network 170, and a network 180 composed of general user devices and enterprise user devices accessing the Internet or the like through the access network 170 and the backbone network 120.

The router backbone network 120 is composed of IP switches (or routers) 100_1–100_4, . . . (hereinafter, occasionally represented by a reference numeral 100) connected with links 110_1, 110_3, 110_4, . . . .

In the backbone network 120 where traffic concentrates, a SONET (Synchronous Optical Network) ring or the like, which is technologically expensive but has a function of detouring a path when a fault or failure occurs in a part of the network, is generally introduced.

The access network 170 is composed of aggregation LAN switches connected to the IP switch 100, and LAN switches connected to the aggregation LAN switches. For example, aggregation LAN switches 140, 140_2, and 140_3 (switches 140_2 and 140_3 are not shown) are respectively connected to the IP switch 100_1 with links 130_1–130_3. LAN switches 160_1–160_8 are respectively connected to the aggregation LAN switch 140_1 with links 150_1–150_8.

Enterprise users or general users are connected to each LAN switch. Enterprise users 191_1, . . . are connected to e.g. the LAN switch 160_1 respectively with links 181_1, . . . . General users 192_1–192_q are connected to the LAN switch 160_2 respectively with links 182_1–182_q.

Similarly, an enterprise user (branch) 194 is connected to the IP switch 100_2 through an aggregation LAN switch 141 and a LAN switch 161.

Thus, the access network 170 and the user network 180 are generally supported by an optical Ethernet (R) where a star-type topology is adopted.

Also, the networks 170 and 180 are generally composed of a switched media method LAN switch or the like, and can inexpensively offer a high-speed communication service and an Internet access service by using existing protocols and technologies such as an IP and Ethernet (R).

Specifically, the network 180 is called a broadband access network which includes the followings: (1) FTTH (Fiber To The Home) connecting a user to an IP network of a carrier with a LAN switch; (2) ADSL (Asymmetrical Digital Subscriber Line) using copper wires which have been used for telephone lines; (3) Wireless LAN, and the like.

Among these, the FTTH is expected in the future, and a construction of an FTTH network connecting end users such as homes and enterprises with optical fibers has already begun.

As described above, the Ethernet (R) technology which has spread within an enterprise network begins to be used for an Internet access or a WAN technology connecting enterprises. However, since the Ethernet (R) technology is a simple point-to-point communication technology, it is inexpensive but basically has no mechanism concerning reliability such as a path detour upon a fault, resulting in a low reliability.

Specifically, the enterprise users, as shown in FIG. 21, connect the head office 191_1 and its branch (e.g. branch 194), or local sites with a VPN service offered by the carriers. Supposing that a fault occurs in a part of the VPN, there is a possibility that communication becomes impossible, which leads to interferences of business operations.

Also, it becomes impossible for the general users to access the Internet when a fault occurs. These lead to a large problem concerning a credibility for the carriers.

While one may conceive to adopt a SONET device or the like having a high reliability for the access network, it is very expensive compared with the LAN switch.

As for the technology to make the Ethernet (R) highly reliable, there is a link aggregation connecting devices with a plurality of Ethernet (R) transmission lines (links).

When a link aggregation technology is adopted for the access network 170 for example, the carriers have to construct the same fibers as the links 150_1–150_8 between an aggregation LAN switch 140 and the LAN switches 160_1–160_8. The constructed fibers become longer as the number of the LAN switches 160 becomes larger.

SUMMARY OF THE INVENTION

It is accordingly an object of the present invention to provide an upper relay, a plurality of lower relays connected thereto with working links, and a network system composed of the upper and the lower relays, wherein communication can be continued even when a working link becomes unavailable due to a fault or the like, and when a shortage of a bandwidth occurs.

[1] Network System

In order to achieve be above-mentioned object, a network system according to the present invention comprises: an upper relay; a plurality of lower relays connected to the upper relay with working links; and one or mars redundant links for mutually connecting the lower relays; the upper relay determines a detour path, for the working link, composed of the other working links and the redundant links.

FIG. 1 shows a network to which a network system according to the present invention is applied. The arrangement of this network is the same as that of the prior art network shown in FIG. 21 except that as shown. An aggregation LAN switch 200 and LAN switches 300_1–300_8 are substituted for the aggregation LAN switch 140 and the LAN switches 160_1–160_8.

The network system of the present invention is composed of the aggregation LAN switch (hereinafter, occasionally referred to as an upper relay) 200 within the network of FIG. 1, the LAN switches (hereinafter, occasionally referred to as lower relays) 300_1–300_8 connected to the LAN switch 200 respectively with links 150_1–150_8, and further redundant links 501–508 connecting the LAN switches 300_1–300_8 in this order like a loop.

It is to be noted that the redundant links are not necessarily connected like a loop, and all of the lower relays are not necessarily connected with the redundant links. Also, it is possible to connect three or more redundant links to the lower relays.

Also, in FIG. 1, the network system of the present invention can be composed by making e.g. a router/IP switch 100_1 an upper relay, by making the aggregation LAN switches 200, 200_2, and 200_3 (LAN switches 200_2 and 200_3 are not shown) connected to the switch 100_1 with links 130_1–130_3 lower relays, and by connecting the LAN switches 200, 200_2, and 200_3 with the redundant links (not shown).

Namely, the arrangement of the network system has such a relationship that the upper relay (LAN switch 200) forms a lower relay of the further upper relay (IP switch 100_1).

Furthermore, the network arrangement may not necessarily be a two-staged arrangement such as "the upper relay and the lower relay". In case of a three or more-staged arrangement, a device accommodating a group of subordinate devices may operate as an upper relay.

FIG. 2 shows an example of the network system in which the lower relays 300_5–300_8 within the network system according to the above-mentioned present invention are omitted for convenience sake. This network system is composed of the upper relay 200 and the lower relays 300_1–300_4 (hereinafter, occasionally represented by a reference numeral 300) connected to the upper relay 200 with the working links 150_1–150_4 (hereinafter, occasionally represented by a reference numeral 150).

Furthermore, the redundant links 501–504 respectively connect the intervals between the lower relays 300_1–300_2, the lower relays 300_2–300_3, the lower relays 300_3–300_4, and the lower relays 300_4–300_1.

The upper relay 200 can determine, for example, a detour path (upper relay 200-working link 150_2-lower relay 300_2-redundant link 501-lower relay 300_1) by the working link 150_2 and the redundant link 501 as a detour path of the path (working link 150_1) between the upper relay 200 and the lower relay 300_1.

It is to be noted that a detour path such as (upper relay 200-working link 150_4-lower relay 300_4-redundant link 504-lower relay 300_1) or (upper relay 200-working link 150_3-lower relay 300_3-redundant link 502-lower relay 300_2-redundant link 501-lower relay 300_1) can be composed.

Thus, it becomes possible to transmit a frame transmitted between e.g. the upper relay 200 and the lower relay 300_1 through the detour path.

Namely, in the network system according to the present invention in the above-mentioned present invention, a frame may be transmitted not through an unavailable working link but through the detour path.

When the working link 150_1 can not be used due to e.g. a fault of the link 150_1 itself, a fault of a port 240_1 of the upper relay 200 connected to the link 150_1, a fault of a port 310_1 of the lower relay 300_1, or the like (indicated by mark X in FIG. 2), it becomes possible for the upper relay 200 to transmit a data frame transmitted from an enterprise user branch 194 through paths ① and ② to an enterprise user head office 191_1 through detour paths ③ and ④ (upper relay 200-working link 150_2-lower relay 300_2-redundant link 501-lower relay 300_1) and a path ⑤.

It is to be noted that the network system of the present invention can similarly transmit the data frame from the lower relay 300_1 to the upper relay 200 through the detour path not through the working link 150_1 which has become unavailable.

Thus, when a fault occurs in the working link 150 directly connecting the upper relay 200 and the lower relay 300, in a port accommodating the working link 150, or the like, communication can be continued through the detour path, resulting in highly reliable communication.

Also, in the network system according to the present invention in the above-mentioned present invention, frames passing through a same lower relay may be distributed and transmitted to the working link and the detour path.

Namely, the network system of the present invention can distribute and transmit, for example, the frames transmitted between e.g. the upper relay 200 and the lower relay 300_1 to the working link 150_1 and the detour path (upper relay 200-working link 150_2-lower relay 300_2-reduntant link 501-lower relay 300_1).

Thus, in case of a bandwidth shortage in the working link 150 directly connecting the upper relay 200 and the lower relay 300, for example, it becomes possible to add the bandwidth of the detour path, thereby securing a necessary bandwidth.

Also, in the present invention in the above-mentioned present invention, the upper relay may be provided with a topology table for holding working link topology information between its own relay and the lower relay, as well as redundant link topology information between the lower relays, and a detour path determiner for determining the detour path based on the topology table.

FIG. 3 shows a principle of the upper relay 200 in the present invention. This upper relay 200 is provided with a topology table including working link topology information indicating that its own relay 200 is connected to the lower relays 300_1–300_4, and redundant link topology information indicating that the intervals between the lower relays 300_1–300_2, the lower relays 300_2–300_3, the lower relays 300_3–300_4, and the lower relays 300_4–300_1 are connected. A detour path determiner 280 can determine a detour path based on the topology table 271.

Also, in the present invention in the above-mentioned present invention, identifiers may be uniquely and respectively allocated to the lower relays themselves and ports of relays terminating the link, and the topology information may be composed of the identifiers.

Namely, in FIG. 2, unique identifiers (ID) "200", and "300_1"–"300_4", for example, are respectively allocated to e.g. the upper relay 200, and the lower relays 300_1–300_4. Also, a port 240_1 of the upper relay 200 and a port 310_1 of the lower relay 300_1 terminate the working link 150_1, and a port 360$w$_1 of the lower relay 300_1 and a port 360$e$_2 of the lower relay 300_2 terminate the redundant link 501. To these ports 240_1, 310_1, 360$w$_1, and 360$e$_2, identifiers "240_1", "310_1", "360$w$_1", and "360$e$_2" for example are respectively allocated.

If these identifiers are used, the working link topology information concerning the working link 150_1, for example, can be indicated by ("240_1", "310_1"). The working link topology information concerning the redundant link 501 can be indicated by ("360$w$_1", "360$e$_2").

Also, in the present invention in the above-mentioned present invention, the lower relay may generate the identifier at random.

Namely, the lower relay can generate unique identifiers by making codes generated at random, for example, identifiers of its own relay and of a port of its own relay.

Also, in the present invention in the above-mentioned present invention, the lower relay may generate the identifier of the port based on a MAC address of the port.

Namely, the lower relay can make the identifier of each port a MAC address itself or make a code generated based on the MAC address an identifier of each port, based on the MAC address uniquely added to each port.

Also, in the present invention in the above-mentioned present invention, the lower relay may make an identifier of its own relay correspond to an identifier of a port of its own relay connected to the working link for the working link topology information to be notified to the upper relay.

While a manager of the network system may preliminarily set the topology information in the topology table, in the present invention the lower relays 300_1–300_4 can notify the working link topology information between its own relay and the upper relay to the upper relay 200. In FIG. 3, the upper relay 200 prepares a topology table based on the notified working link topology information.

Also, in the present invention in the above-mentioned present invention, the lower relay may make an identifier of its own relay correspond to identifiers of ports of its own relay and of an adjoining lower relay terminating the redundant link for the redundant link topology information to be notified to the upper relay.

Namely, each lower relay 300 notifies the redundant link topology information between its own relay and other lower relays 300 connected with the redundant link to the upper relay 200.

The upper relay 200 prepares the topology table 271 (see FIG. 3) based on the notified redundant link topology information.

Also, in the present invention in the above-mentioned present invention, the lower relay may exchange identifiers of ports terminating the redundant link with an adjoining lower relay connected with the redundant link, and may generate the redundant link topology information based on the exchanged port identifiers and the identifier of its own relay.

Namely, the lower relay 300 exchanges the identifiers of the ports which mutually terminate the redundant link between its own relay and the adjoining lower relay 300 connected with the redundant link. Thus, the lower relay 300 can generate the redundant link topology information in which the identifier of its own relay and the identifier of the ports which terminate the redundant link are made correspond with each other.

Also, in the present invention in the above-mentioned present invention, the detour path determiner may select the detour path on which a number of lower relays being passed is smallest.

Also, in the present invention in the above-mentioned present invention, the upper relay may be provided with a table indicating a priority of the lower relay, and the detour path determiner may select the detour path which passes through a lower relay with a high priority based on the table.

Also, in the present invention in the above-mentioned present invention, the upper relay may be provided with a traffic monitor for monitoring a traffic load of each working link, and the detour path determiner may determine the detour path based on the traffic load.

Namely, in FIG. 3, the upper relay 200 is provided with a traffic monitor 260, which monitors a traffic load of each working link 150. The detour path determiner 280, based on the traffic load, selects e.g. the working link 150 with less traffic load to determine the detour path.

Also, in the present invention in the above-mentioned present invention, the upper relay may be provided with a table indicating bandwidth information of each link, and the detour path determiner may determine the detour path based on the bandwidth information.

Namely, in FIG. 3, the upper relay 200 is provided with a table (not shown) indicating e.g. the bandwidth information of each working link 150. The detour path determiner 280 can select e.g. a broadband working link based on the bandwidth information and determine the detour path. It is to be noted that the detour path determiner 280 may determine the detour path based on the bandwidth information of the redundant link or the bandwidth information between the redundant link and the working link.

Also, in the present invention in the above-mentioned present invention, the upper relay may be further provided with a traffic destination discriminator for discriminating a frame destination and for selecting either the working link or the detour path based on a result of the discrimination.

Namely, in FIG. 3, the upper relay 200 is provided with a traffic destination discriminator 220, which discriminates a destination of a frame, selects either a usual working link or a detour path based on the discrimination result, and transmits the frame through the selected path.

Also, in the present invention in the above-mentioned present invention, the upper relay may be further provided with a detour frame generator for generating a detour frame to which an identifier of the lower relay itself designating the detour path or of a port of the relay is added to a frame transmitted through the detour path.

Namely, in FIG. 3, the upper relay 200 is provided with a detour frame generator 290, which adds the identifier of the lower relay 300 itself or the port of the relay to the frame transmitted through the detour path, and designates the detour path. Namely, a frame in which the identifier is added to the original frame is a detour frame.

Thus, it becomes possible to transmit the detour frame through the detour path determined based on the identifier of the port.

Also, in the present invention in the above-mentioned present invention, the traffic destination discriminator may discriminate frames addressed to a user device enjoying a bandwidth guarantee service, and may distribute and transmit the frames to the working link or the detour path.

Namely, a bandwidth guarantee service is contracted for e.g. user devices A and B. The traffic destination discriminator 220 discriminates the frames addressed to the user devices A and B, and distributes and transmits the frames to the working link or the detour path.

For example, the frame addressed to the contracted user device A is transmitted through the working link, and the frame addressed to the contracted user device B is transmitted through the detour path. Alternatively, the frames addressed to the contracted user device A are distributed and transmitted to the working link and the detour path.

Thus, it becomes possible to transmit the frames addressed to the contracted user with a broad bandwidth in which the bandwidth of the detour path is added to the bandwidth of the working link, and to perform the bandwidth guarantee service.

Also, in the present invention in the above-mentioned present invention, the upper relay may be further provided with a fault detector for detecting an unavailable working link, and the traffic destination discriminator may transmit a frame not to the unavailable working link but to the detour path.

Namely, the upper relay 200 is provided with a fault detector 250 (see FIG. 3), which detects e.g. an unavailable working link 150_1. The traffic destination discriminator 220 transmits the frames to the detour path via e.g. the working link 150_2 instead of the working link 150_1.

Thus, it becomes possible to detour and transmit the frame through the detour path when a fault occurs on the working link.

Also, in the present invention in the above-mentioned present invention, when the fault detector detects that the unavailable working link has been recovered, the traffic destination discriminator may transmit a frame through the recovered working link.

Namely, when the working link has been recovered, the traffic destination discriminator 220 can transmit a frame, which has been transmitted through e.g. the detour path, to the working link.

Also, in the present invention in the above-mentioned present invention, the traffic destination discriminator may discriminate a frame addressed to a user device enjoying a highly reliable service to be transmitted to the detour path.

Namely, a highly reliable service is contracted for e.g. the user device A. When the fault detector 250 detects that the working link through which the frame addressed to the user device A is transmitted is unavailable, the traffic destination discriminator 220 transmits the frame addressed to the user device A through the detour path.

Thus, the frame addressed to the contracted user device A can be transmitted through the detour path even when the working link becomes unavailable, so that the highly reliable service can be enjoyed.

Also, in the present invention in the above-mentioned present invention, the detour path determiner may further generate a detour path notification frame including information of the detour path, and may transmit the notification frame to the lower relay terminating the detour path.

Namely, the detour path determiner 280 determines a detour path e.g. from the upper relay 200 to the lower relay 300_1. However, the lower relay 300_1 does not recognize a detour path from the lower relay 300_1 to the upper relay 200.

Therefore, the detour path determiner 280 generates a detour path notification frame by which the determined detour path information is transmitted to e.g. the lower relay 300_1, and transmits the detour path notification frame to e.g. the lower relay 300_1 through the detour path.

Thus, the lower relay 300_1 can recognize the detour path of the frame toward the upper relay 200. It is to be noted that the detour path from the upper relay 200 to the lower relay 300_1 may be different from that from the lower relay 300_1 to the upper relay 200. Also, the path transmitting the detour path notification frame may be different from these detour paths.

Also, in the present invention in the above-mentioned present invention, the detour path notification frame may include information of a notification path, which transmits the notification frame itself, composed of identifiers of the lower relay which is a destination of the notification frame and of ports to be passed, and the detour path information composed of identifiers of ports to be passed.

Thus, the detour path notification frame is transmitted to the destination lower relay of the notification frame based on the information of the notification path, so that the destination lower relay can recognize the detour path information.

Also, in the present invention in the above-mentioned present invention, the lower relay may have a traffic destination discriminator for terminating the detour frame or for transferring the detour frame to other lower relays based on an identifier of the lower relay itself or of a port of the lower relay designating the detour path added to a detour frame received from the detour path.

FIG. 4 shows a principle of the lower relay 300 shown in FIG. 2. This lower relay 300 specifically indicates the lower relay 300_2 as an example (see FIG. 2). However, the arrangements of the other lower relays 300 are the same as that of the lower relay 300_2 in FIG. 4 except the reference numerals of the links to be connected. The lower relay 300 is provided with traffic destination discriminators 350w, 350e (hereinafter, occasionally represented by a reference numeral 350).

It is to be noted that the number of discriminators 350 is the same as that of the redundant links connected to the lower relay 300. In FIG. 4, the lower relay 300 is provided with two discriminators 350 corresponding to the redundant links 501 and 502.

The traffic destination discriminator 350w, for example, terminates the received frame or transmits the received frame to the redundant link 501 through a frame switch 330 and a port 360ea in order to transfer the received frame to another lower relay 300, based on the identifiers of the lower relay and the port added to the detour frame received through the redundant link 502 and a port 360wb (detour path).

Thus, it becomes possible for the lower relay 300 which finally terminates the detour frame to transmit the original frame included in the detour frame to the destination user device.

Also, in the present invention in the above-mentioned present invention, the lower relay may be further provided with an identifier remover for removing an unnecessary identifier added to the frame.

Namely, in FIG. 4, the lower relay 300 has an identifier remover (not shown), which removes an unnecessary identifier added to the detour frame.

Also, in the present invention in the above-mentioned present invention, the lower relay may be further provided with a detour path information holder for holding information of the detour path included in a detour path notification frame from the upper relay, and a path detour portion for transmitting a frame to the detour path in a direction of the upper relay.

Namely, the upper relay 200 transmits the detour path notification frame to the lower relay 300. In this detour path notification frame, the detour path information of the frame transmitted from the lower relay 300 to the upper relay 200 is included.

The lower relay 300 is provided with a detour path information holder 380 and a path detour portion 390 (see FIG. 4). The detour path information holder 380 stores the detour path information included in the detour frame. The path detour portion 390 transmits the frame toward the upper relay 200 to the detour path designated by the detour path information.

Thus, it becomes possible for the lower relay 300 to transmit a frame from e.g. the user 192_1 (see FIG. 2) to the upper relay 200 through the detour path designated by the upper relay 200.

Also, in the present invention in the above-mentioned present invention, the path detour portion may discriminate frames from a user device enjoying a bandwidth guarantee service, and may distribute and transmit the discriminated frames to the working link and the detour path.

Namely, a bandwidth guarantee service is contracted for the user devices 192_1 and 192_2. The path detour portion 390 discriminates and transmits the frame of e.g. the user device 192_1 to the detour path.

Thus, it becomes possible for the network system of the present invention to transmit a frame from the lower relay 300 to the upper relay 200 on a broad bandwidth where the bandwidth of the detour path is added to the bandwidth of the working link, and to perform a bandwidth guarantee service even when the bandwidth guarantee service can not be performed only with the working link.

Also, in the present invention in the above-mentioned present invention, when the working link is unavailable, the path detour portion may discriminate frames from a user device enjoying a highly reliable service to be transmitted to the detour path.

Namely, the highly reliable service is contracted for e.g. the user devices 192_3 and 192_4. When the working link is unavailable, the path detour portion 390 discriminates the frames from the user devices 192_3 and 192_4 to be transmitted to the detour path.

Thus, it becomes possible for the network system of the present invention to perform the highly reliable service of the frame from the lower relay 300 to the upper relay 200 through the detour path.

Furthermore, in the present invention in the above-mentioned present invention, the relay may comprise a LAN switch or an IP switch.

[2] Upper Relay

Also, in order to achieve the above-mentioned object, an upper relay according to the present invention determines a detour path, of a single arbitrary working link within working links respectively connecting its own relay and a plurality of lower relays, composed of other working links and one or more redundant links mutually connecting the lower relays.

Namely, in the same way as the upper relay in the network system of the above-mentioned present invention, a plurality of lower relays are connected to the upper relay of the present invention with working links. Also, the lower relays are connected with the redundant links.

The upper relay can determine a detour path composed of other working links and one or more redundant links, as a detour path of the working link.

Thus, it becomes possible to continue the communication through the detour path even when the working link becomes unavailable due to a fault or the like, or a bandwidth shortage arises.

The action of the upper relay of the present invention described hereinafter is the same as that of the upper relay in the network system of the above-mentioned present invention.

Namely, the present invention in the above-mentioned present invention may further comprise a topology table for holding working link topology information between its own relay and the lower relays, as well as redundant link topology information between the lower relays, and a detour path determiner for determining the detour path based on the topology table.

Also, the present invention in the above-mentioned present invention may further comprise a traffic destination discriminator for discriminating a frame destination and for selecting either the working link or the detour path based on a result of the discrimination.

Also, the present invention in the above-mentioned present invention may further comprise a detour frame generator for generating a detour frame to which an identifier of the lower relay itself designating the detour path or of a port of the relay is added to a frame transmitted through the detour path.

Also, in the present invention in the above-mentioned present invention, the traffic destination discriminator may discriminate frames addressed to a user device enjoying a bandwidth guarantee service, and may distribute and transmit the frames to the working link or the detour path).

Also, the present invention in the above-mentioned present invention may further comprise a fault detector for detecting an unavailable working link, and the traffic destination discriminator transmits a frame not to the unavailable working link but to the detour path.

Also, in the present invention in the above-mentioned present invention, the traffic destination discriminator may discriminate a frame addressed to a user device enjoying a highly reliable service to be transmitted to the detour path.

Furthermore, in the present invention in the above-mentioned present invention, the detour path determiner may further generate a detour path notification frame including information of the detour path, and may transmit the notification frame to the lower relay terminating the detour path.

[3] Lower Relay

Also, in order to achieve the above-mentioned object, a lower relay according to the present invention determines a detour path, of a working link connecting its own relay and an upper relay, including other working links connecting the upper relay and other lower relays, and redundant links connecting its own relay and the other lower relays.

Namely, the lower relay of the present invention is connected to the upper relay with the working link, and is connected to other lower relays with the redundant links. As a detour path of the working link, the lower relay can determine a detour path including other working links connecting the upper relay and the other lower relays, and the redundant links (may further include the redundant links connecting other lower relays).

Thus, it becomes possible for the lower relay to continue the communication through the detour path even when the working link becomes unavailable due to a fault or the like, and the bandwidth shortage arises.

It is to be noted that the lower relay of the present invention may determine the detour path notified from the upper relay as a detour path of the working link in the same way as the lower relay in the above-mentioned network system, or the lower relay itself may determine the detour path.

The operation of the lower relay of the present invention described hereinafter is the same as that of the lower relay in the network system of the above-mentioned present invention.

Namely, in the lower relay according to the present invention in the above-mentioned present invention, working link topology information in which an identifier of its own relay is made correspond to an identifier of a port of its own relay connected to the working link may be notified to the upper relay.

Also, in the present invention in the above-mentioned present invention, redundant link topology information in which an identifier of its own relay made correspond to identifiers of ports of its own relay and of an adjoining lower relay terminating the redundant link may be notified to the upper relay.

Also, in the present invention in the above-mentioned present invention, identifiers of ports terminating the redundant link may be exchanged between adjoining lower relays connected with the redundant link, and the redundant link topology information may be generated based on the exchanged port identifiers and the identifier of its own relay.

Also, the present invention in the above-mentioned present invention may further comprise a traffic destination discriminator for terminating the detour frame or for transferring the detour frame to other lower relays based on an identifier of the lower relay itself or of a port of the lower relay designating the detour path added to a detour frame received from the detour path.

Also, the present invention in the above-mentioned present invention may further comprise a detour path information holder for holding information of the detour path included in a detour path notification frame from the upper relay, and a path detour portion for transmitting a frame to the detour path in a direction of the upper relay.

Also, in the present invention in the above-mentioned present invention, the path detour portion may discriminate frames from a user device enjoying a bandwidth guarantee service, and may distribute and transmit the discriminated frames to the working link or the detour path.

Furthermore, in the present invention in the above-mentioned present invention, when the working link is unavailable, the path detour portion may discriminate frames from a user device enjoying a highly reliable service to be transmitted to the detour path.

BRIEF DESCRIPTION OF THE DRAWINGS

The above and other objects and advantages of the invention will be apparent upon consideration of the following detailed description, taken in conjunction with the accompanying drawings, in which the reference numbers refer to like parts throughout and in which:

FIG. 8 is a diagram showing a topology table example in an embodiment (1) of a network system according to the present invention;

FIG. 9 is a diagram showing a format of a general MAC frame;

FIG. 14 is a diagram showing a format example of a detour path notification frame in a network system according to the present invention;

FIG. 15 is a diagram showing a topology table example in an embodiment (2) of a network system according to the present invention;

FIG. 16 is a diagram showing a topology table example in an embodiment (3) of a network system according to the present invention;

FIG. 17 is a diagram showing a topology table example in an embodiment (4) of a network system according to the present invention;

DESCRIPTION OF THE EMBODIMENTS

In embodiments (1)–(6) described hereinafter, a network arrangement of a VPN or FTTH access service offered by carriers will be mentioned. However, the network system of the present invention can be applied to a wide-area LAN service using only LAN switches for the arrangement of the network in its entirety and a LAN environment within an enterprise. Also, the medium is not limited to an optical fiber, but a twisted-pair cable of copper wire usually used in e.g. an enterprise may be employed.

Also, the network system of the embodiments (1)–(6) is composed of upper and lower relays according to the present invention.

[1] Embodiment (1)

Figure 5:
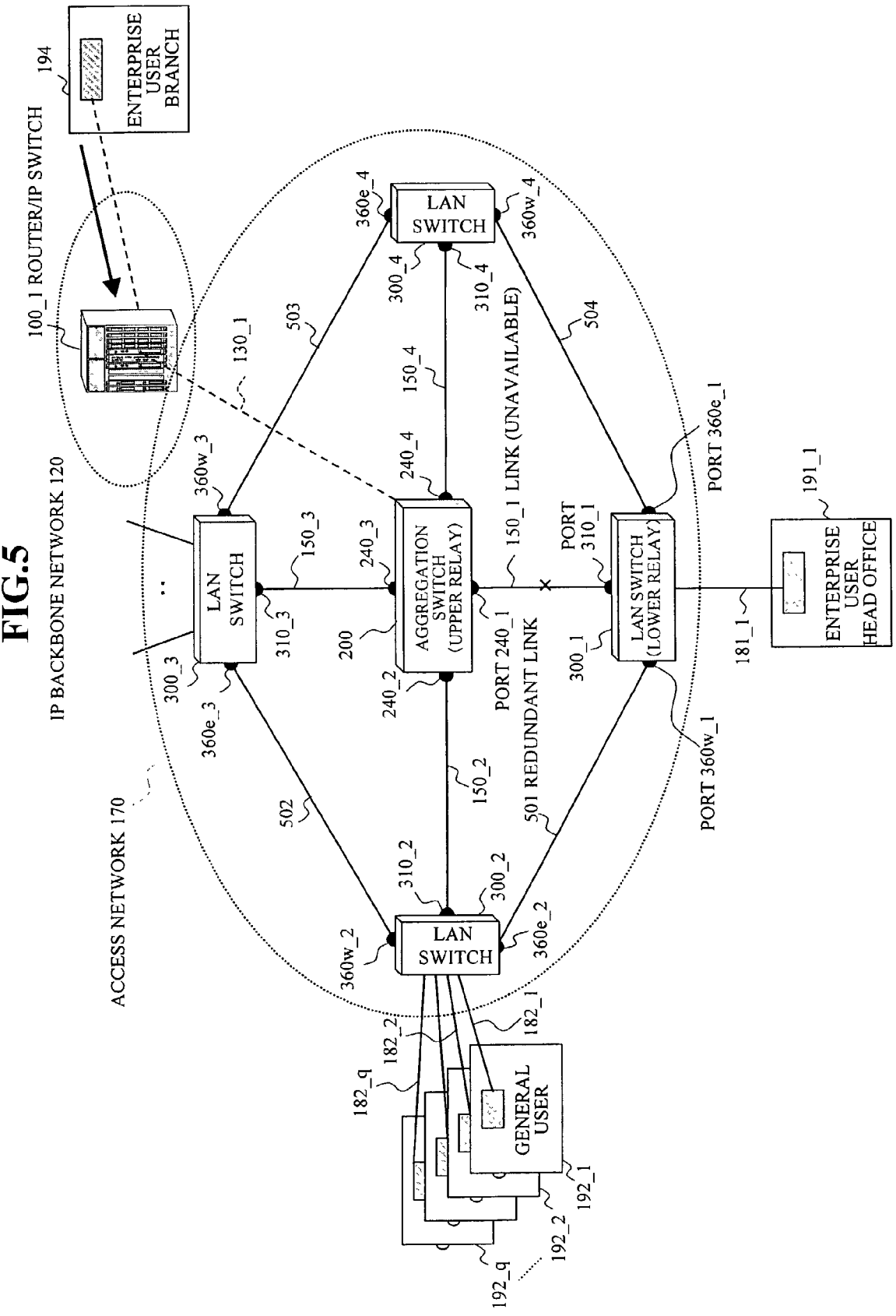
FIG. 5 is a block diagram showing an embodiment (1) of a network system according to the present invention.

FIG. 5 shows an embodiment (1) of a network system according to the present invention.

Figure 1:
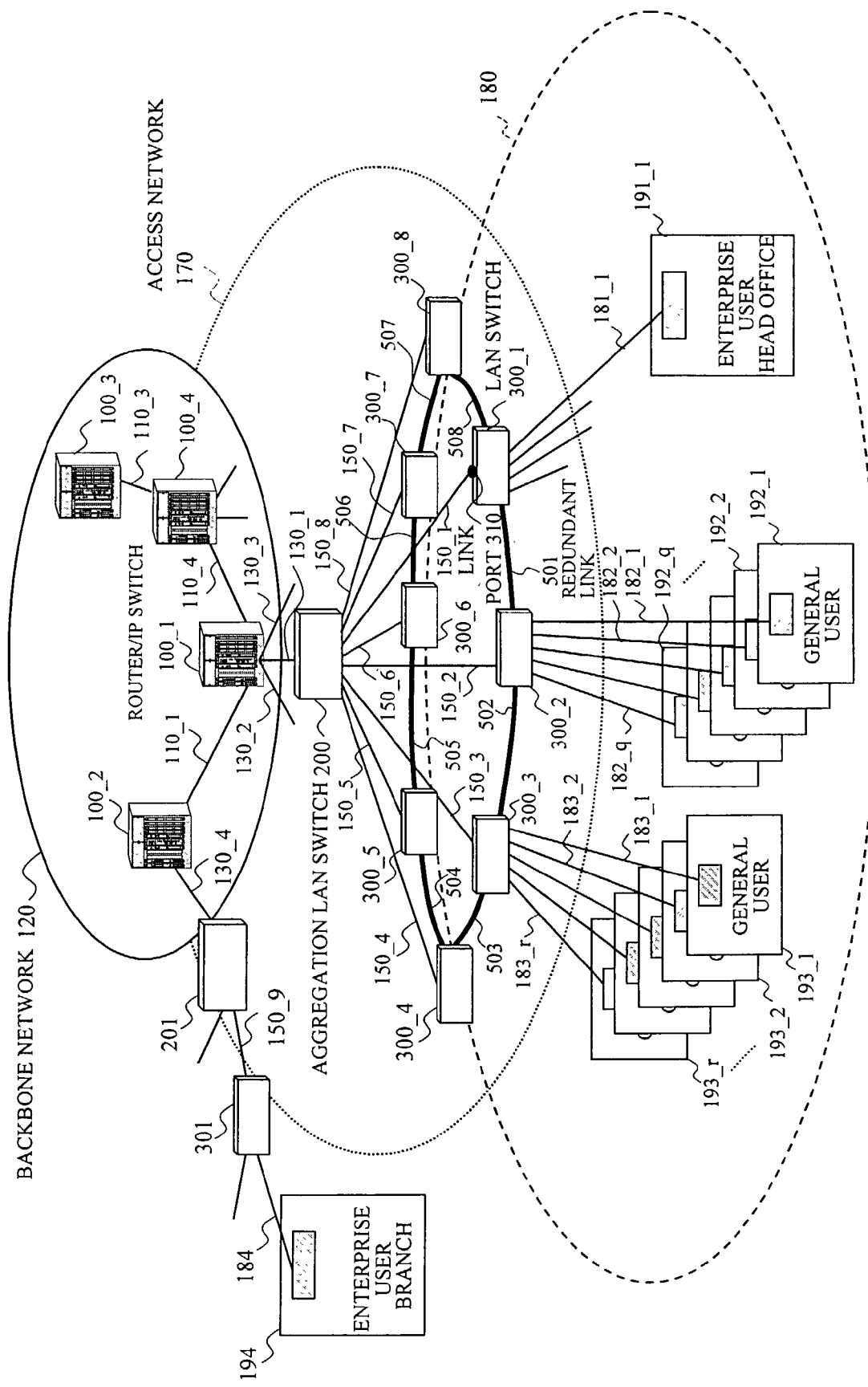
FIG. 1 is a block diagram showing a network example to which upper and lower relays and a network system according to the present invention are applied.
Figure 2:
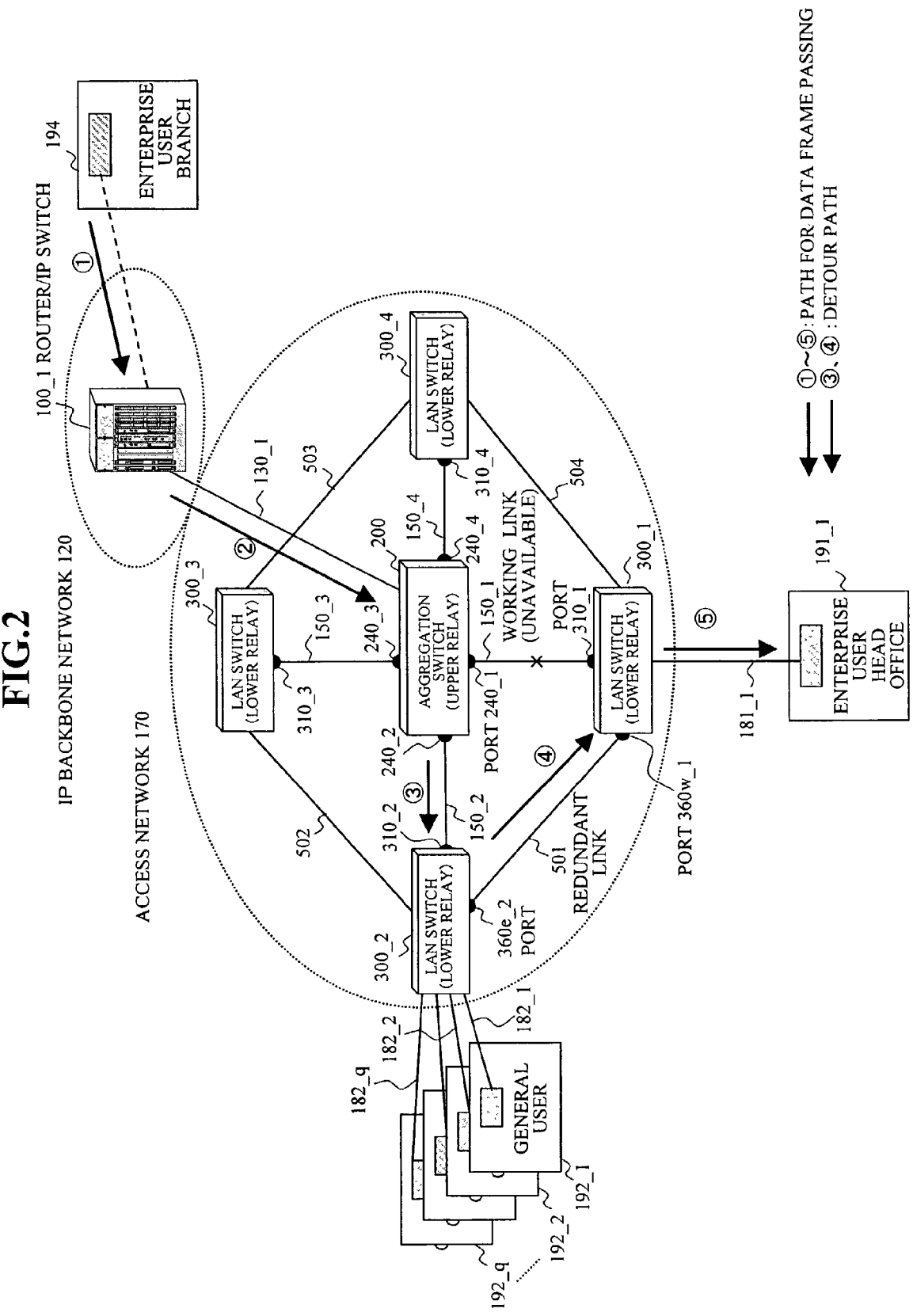
FIG. 2 is a block diagram showing a principle of upper and lower relays and a network system according to the present invention.
Figure 3:
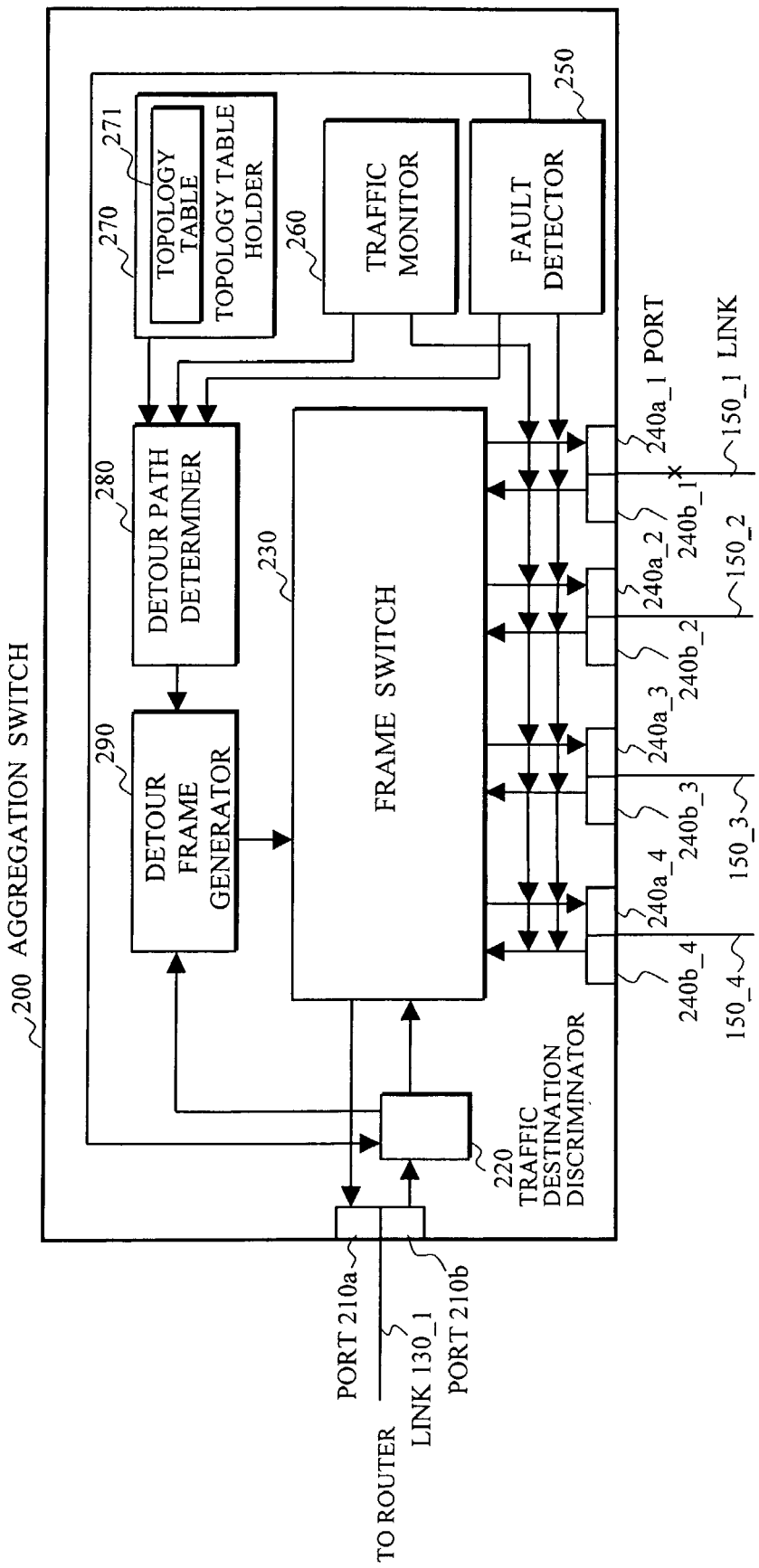
FIG. 3 is a block diagram showing a principle of an upper relay according to the present invention.
Figure 4:
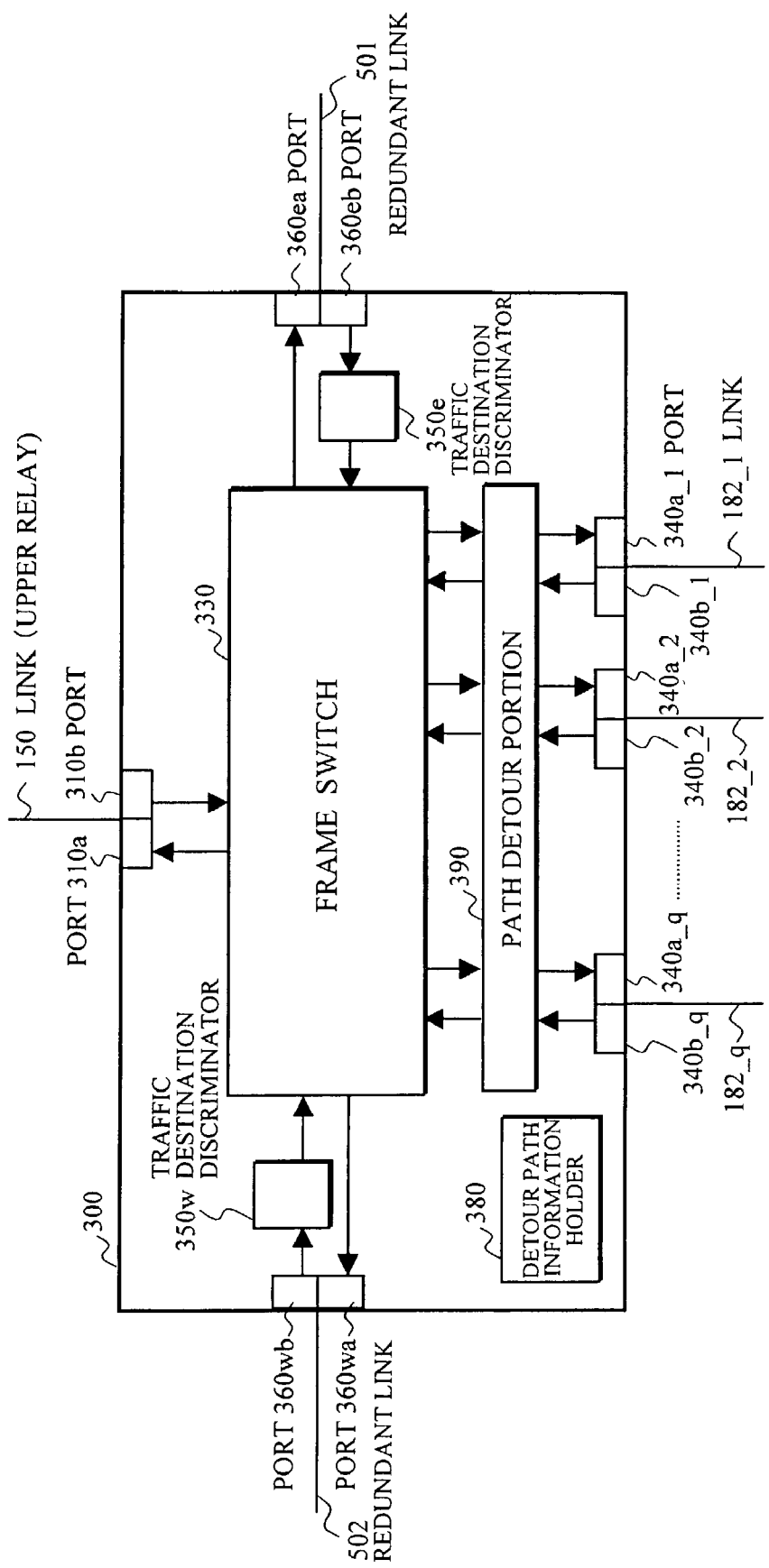
FIG. 4 is a block diagram showing a principle of a lower relay according to the present invention.

This network system is a simplified access network 170, shown in FIG. 1, composed of the aggregation LAN switch 200 connected to the IP switch 100_1, and the LAN switches 300_1–300_4 (occasionally, represented by a reference numeral 300) connected thereto. Accordingly, the redundant link 504 shown in FIG. 1 connects the LAN switch 300_4 to the LAN switch 300_1.

It is to be noted that the aggregation LAN switch 200 will be hereinafter occasionally referred to as the upper relay, and the LAN switches 300_1–300_4 will be hereinafter referred to as the lower relays for convenience sake.

Figure 6:
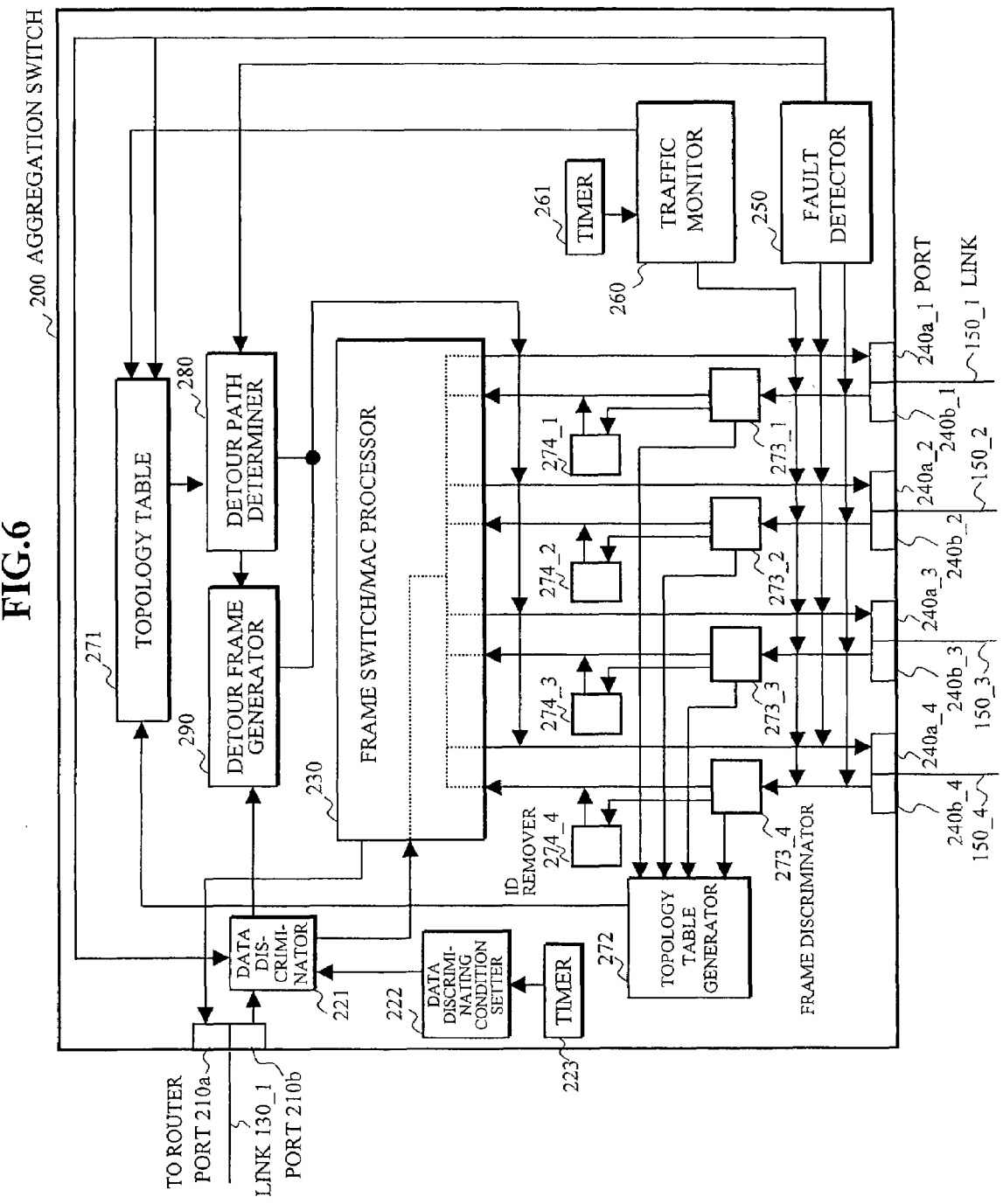
FIG. 6 is a block diagram showing an arrangement of an upper relay of the present invention in an embodiment (1) of a network system according to the present invention.

FIG. 6 shows an embodiment of the upper relay 200 (i.e. the aggregation LAN switch 200 shown in FIG. 5) in the network system according to the present invention. This upper relay 200 is provided with ports 210a, 210b, . . . , 240a_4, and 240b_4 (hereinafter, occasionally represented by reference numerals 240a and 240b respectively) connected to the links 130_1, and 150_1–150_4.

The upper relay 200 is further provided with a data discriminator 221, a data discriminating condition setter 222, a timer 223, a frame switch/MAC processor 230, a fault detector 250, a traffic monitor 260, a timer 261, a topology table 271, a topology table generator 272, frame discriminators 273_1–273_4 (hereinafter, occasionally represented by a reference numeral 273), identifier removers 274_1–274_4 (hereinafter, occasionally represented by a reference numeral 274), a detour path determiner 280, and a detour frame generator 290.

Figure 7:
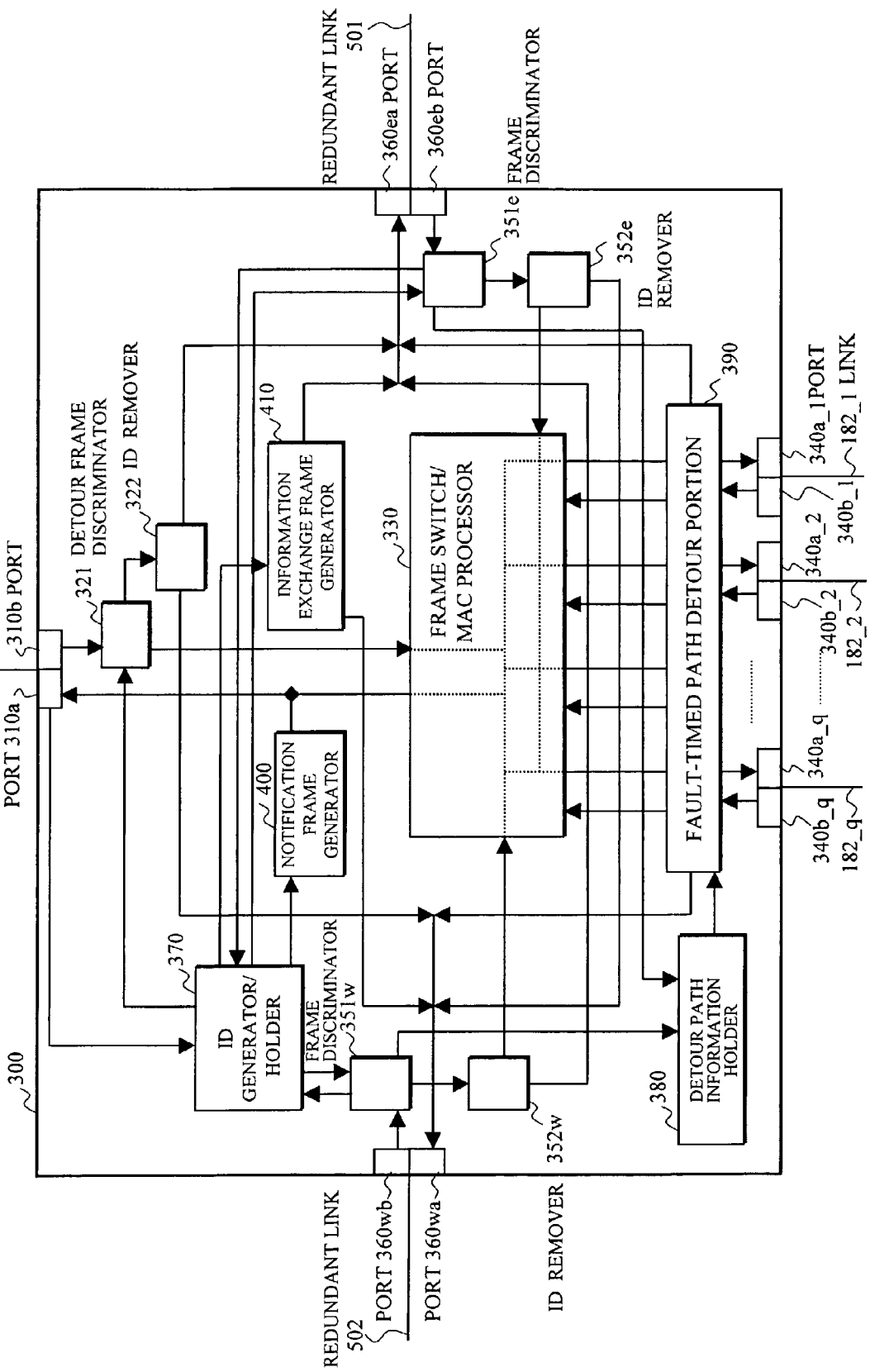
FIG. 7 is a block diagram showing an arrangement of a lower relay of the present invention in an embodiment (1) of a network system according to the present invention.

FIG. 7 shows an embodiment of the lower relay 300 (i.e. the LAN switch 300 shown in FIG. 5) in the network system according to the present invention. This lower relay 300, e.g. the LAN switch 300_2 (see FIG. 5), is provided with ports 310a and 310b (represented by a reference numeral 310_2 in FIG. 5) connected to the link 150 (link 150_2 in FIG. 5), ports 360ea and 360eb (represented by a reference numeral 360e_2 in FIG. 5) connected to the redundant link 501, ports 360wa and 360wb (represented by a reference numeral 360w_2 in FIG. 5) connected to the redundant link 502, and ports 340a_1, 340b_1, . . . , 340a_q, and 340b_q (hereinafter, occasionally represented by reference numerals 340a and 340b, respectively) connected to the links 182_1–182_q, respectively.

Furthermore, the lower relay 300 is provided with a detour frame discriminator 321, identifier removers 322, 352e, and 352w, a frame switch/MAC processor 330, frame discriminators 351e and 351w, an identifier generator/holder 370, a detour path information holder 380, a fault-timed path detour portion 390, a notification frame generator 400, and an information exchange frame generator 410.

[1-1] Topology Collection of Access Network

The upper relay 200 collects topology information of the access network including its own relay and the lower relays 300 in the topology table 271a (topology table 271 in FIG. 6).

FIG. 8 shows an embodiment of the topology table 271a, which is composed of a usual link topology table 271a_1 and a redundant link topology table 271a_2.

The usual link topology table 271a_1 indicates the topology of the links 150_1–150_4 connecting the upper relay 200 to the lower relays 300. Namely, the table 271a_1 indicates the identifiers "300_1"–"300_4", where the same identifiers as the reference numerals are used for convenience sake; hereinafter, the same applies to the other identifiers, of the lower relays 300_1–300_4 which are subordinate to the upper relay 200, the identifiers "240_1"–"240_4" of the ports 240_1–240_4 of the upper relay 200 connected to the lower relays 300_1–300_4, and the identifiers "310_1"–"310_4" of the ports 310_1–310_4 of the lower relays 300_1–300_4 which are respectively made correspond to each other.

Data D1 of the table 271a_1, for example, are concerned with the link 150_1, which make the identifier "300_1" of the lower relay 300_1 correspond to the identifier "240_1" of the port 240_1 of the upper relay 200 (its own relay) and the identifier "310_1" of the port 310_1 of the lower relay 300_1 (relay to be connected).

The redundant link topology table 271a_2 indicates the topology of the redundant links 501–504 connecting the lower relays 300 in a loop. Namely, the table 271a_2 makes the identifiers "360e_1", "360w_1", . . . , "360e_4", "360w_4" of the ports of the lower relays 300_1–300_4 connecting the redundant links 501–504 correspond to the identifiers "300_1"–"300_4" of the connected relays, i.e. the lower relays 300_1–300_4 (see FIG. 5).

Data D2 of the table 271a_2, for example, indicate that the connected relays, i.e. the lower relays 300_2 and 300_4 are respectively connected to the other ends of the ports 360w_1 and 360e_1 of the lower relay 300_1 (its own relay).

It is to be noted that the generation methods of the identifiers are, for example, as follows: (1) Method in which the identifier generator/holder 370 in the lower relay 300 generates a random value to be made the identifier of its own relay or the port identifier; (2) Method in which a MAC address unique for each port is used for a port identifier, and the like.

Hereinafter, a procedure of collecting the topology information for preparing the topology table 271a of FIG. 8 will be described.

The topology information is collected by a notification frame 720 and an information exchange frame 740. A general MAC frame 700 is used for the frames 720 and 740.

FIG. 9 shows an arrangement of the MAC frame 700, which is composed of a preamble 701, a Start Frame Delimiter (hereinafter, abbreviated as SFD) 702, a destination MAC address 703, a source MAC address 704, a type field 705, a user data field 706, a frame check sequence (FCS) 707, and the like.

The preamble 701 is "10101010 . . . 10101010" of 56 bits. The SFD 702 is "10101011" of 8 bits. The type field 705 is a 2-byte field and its object and values are prescribed by an RFC (Request for Comments) 1700. The type field="0800 (hexadecimal), for example, indicates that an upper layer is an IP (Internet Protocol).

A header (MAC header) of the MAC frame is composed of the destination MAC address 703, the source MAC address 704, and the type field 705.

Figure 10:
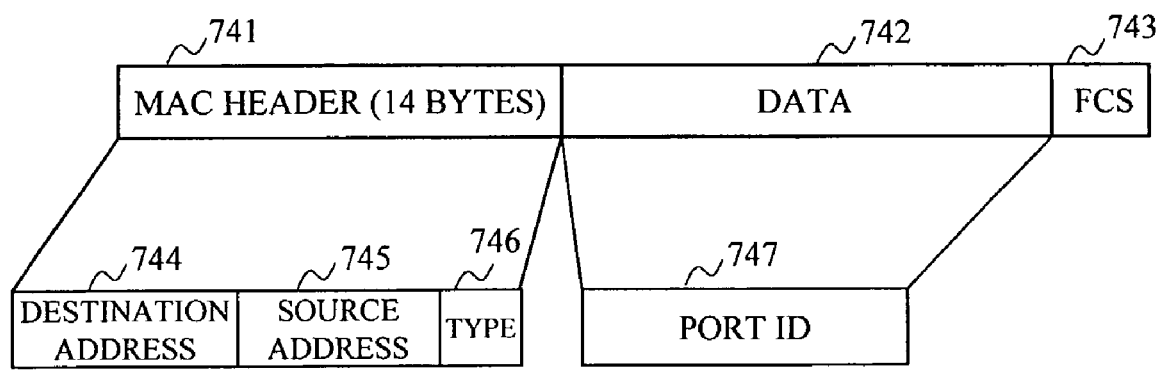
FIG. 10 is a diagram showing a format example of an information exchange frame in a network system according to the present invention.

FIG. 10 shows a format of an information exchange frame 740. The frames 740 are exchanged between the ports of the lower relays 300 connected with the redundant links 501–504, and mutually notify the identifier of the port.

The information exchange frame 740 is composed of a MAC header 741, a data field 742 in which a port identifier 747 is set, and an FCS 743. The MAC header 741 is composed of a destination address field 724, a source address field 725, and a type field 726. In the type field 746, "FFFO" not prescribed in the RFC 1700 is set.

In FIG. 7, the information exchange frame generator 410 in e.g. the lower relay 300_2 generates the information exchange frame 740 in which the identifier "360e_1" (see FIG. 5) of the port 360ea connected to the redundant link 501 is set in the data field 742, and transmits the frame 740 from the port 360ea. Similarly, the generator 410 transmits the information exchange frame 740 in which the identifier "360w_2" (see FIG. 5) of the port 360wa is set in the data field 742 from the port 360wa.

Similarly, the information exchange frame generators 410 of the other lower relays 300 respectively generate the information exchange frames 740 to be transmitted from the ports.

The frame discriminator 351e in the lower relay 300_2 receives the information exchange frame 740 from the lower relay 300_1 through the redundant link 501 and the port 360eb. In the data field 742 of the information exchange frame 740, the port identifier "360w_1" of the lower relay 300_1 is set.

The frame discriminator 351e discriminates that the information exchange frame 740 is an information exchange frame, and transmits the same to the identifier generator/holder 370. The identifier generator/holder 370 stores the topology information (redundant link port identifier "360e_2"/adjoining port identifier "360w_1") in which the identifier "360e_2" of the port 360eb having received the information exchange frame 740 is made correspond to the received identifier "360w_1".

Similarly, the port 360wb in the lower relay 300_2 receives the information exchange frame 740 in which the port identifier "360e_3" from the lower relay 300_3 through the redundant link 502 is set. The identifier generator/holder 370 stores the topology information (redundant link port identifier "360w_2"/adjoining port identifier "360e_3").

Figure 11:
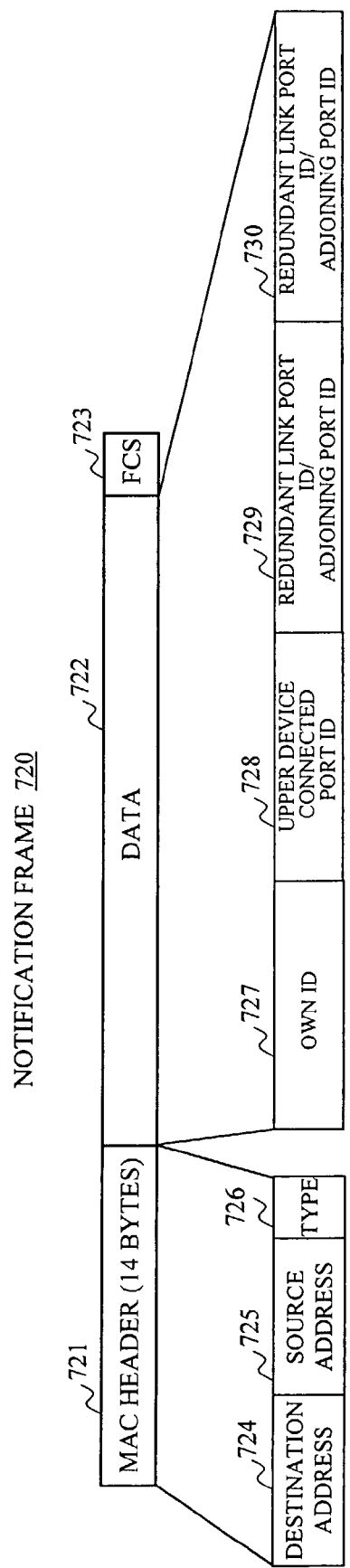
FIG. 11 is a format example of a notification frame in a network system according to the present invention.

FIG. 11 shows a format of a notification frame 720. By this notification frame 720, the lower relay notifies, to the upper relay 200, the topology information of the usual link connecting its own relay and the upper relay, and the topology information concerning the redundant link held in the identifier generator/holder 370.

The notification frame 720 is composed of a MAC header 721, a data field 722, and an FCS 723. In a type field 726 of the MAC header 721, in the same way as the information exchange frame 740, an identifier "FFFF" for identifying e.g. the notification frame 720 may be set.

The data field 722 is composed of an identifier 727 of the lower relay itself, a port identifier 728 connected to the upper relay 200, topology information (redundant link port identifier/adjoining port identifier) 729 indicating the identifier of the port connected to the redundant link and the port identifier of the relay to be connected, and topology information (redundant link port identifier/adjoining port identifier) 730.

It is to be noted that the same number of topology information as the redundant links connected to the lower relay 300 is inserted.

In FIG. 7, the notification frame generator 400 in e.g. the lower relay 300_2 generates the notification frame 720_2. In the fields 727, 728, 729, and 730 of the generated notification frame 720_2, the identifier "300_2" of its own relay, the identifier "310_2" (see FIG. 5) of the port connected to the upper relay 200, the topology information ("360e_2"/ "360w_1") and ("360w_2"/"360e_3") stored in the identifier generator/holder 370 are respectively set.

The notification frame generator 400 transmits the generated notification frame 720_2 to the upper relay 200 through the port 310a, i.e. the link 150_2 (see FIG. 5).

Similarly, the notification frame generators 400 in other lower relays 300_1, 300_3, and 300_4 transmit the generated notification frames 720_1, 720_3, and 720_4 to the upper relay 200.

In FIG. 6, the upper relay 200 receives the notification frames 720_1–720_4 (hereinafter, occasionally represented by a reference numeral 720) from the lower relays 300 through the ports 240b respectively. The frame discriminator 273 recognizes the notification frame because of the "type field 726"="FFFF" in the notification frame 720, so that the identifiers 727 and 728, and the topology information 729 and 730 set in the data field 722 in the notification frame 720 are provided to the topology table generator 272.

The topology table generator 272 generates the usual link topology table 271a_1 and the redundant link topology table 271a_2 based on the identifiers 727 and 728, and the topology information 729 and 730 included in the notification frames 720_1–720_4 from the lower relays 300_1–300_4.

The topology table generator 272, for example, prepares the data D1 (see FIG. 8) corresponding to the lower relay 300_1 in the usual link topology table 271a_1 in which the identifier "240_1" (see FIG. 5) of the port 240b_1 of its own relay having received the notification frame 720_1, the "identifier 727"="300_1" of the lower relay 300_1 included in the notification frame 720_1, and the "identifier 728"="310_1" of the port are made correspond to each other.

Also, the topology table generator 272 prepares the data D3 and D4 (see FIG. 8) corresponding to e.g. the lower relay 300_1 in the redundant link topology table 271a_2 by the following procedures:

The topology table generator 272 firstly detects the notification frame 720_4 including the topology information 729=("360w_4", "360e_1") in which the "redundant link port identifier" and the "adjoining port identifier" in the topology information 729=("360e_1", "360w_4") included in the notification frame 720_1 are reversed.

The topology table generator 272 sets the data D3, in the table 271a_2, in which the identifier "300_1" of its own relay in the notification frame 720_1, the identifier "360e_1" of the redundant link port, and the identifier "300_4" of its own relay in the notification frame 720_4 are made correspond to each other. Also, the topology table generator 272 sets the data D4 in which the identifier "300_4" of its own relay in the notification frame 720_4, the identifier "360w_4" of the redundant link port, and the identifier "300_1" of its own relay in the notification frame 720_1 are made correspond to each other or mutually associated.

Similarly, the topology table generator 272 sets other data in which two lower relays and port identifiers are made correspond to each other.

As described above, the processings required for preparing the topology table 271a in the network system of the present invention are only following two: (1) Processing of each lower relay 300 notifying the port identifier of its own relay and its connection state only to the upper relay 200 directly connected to its own relay; (2) Processing of the upper relay 200 grasping the topology of the network system in its entirety based on the notification.

A topology management (above-mentioned processings (1) and (2)) of the present invention has almost no influence on operations of other processings. Also, the topology management of the present invention is not complicated compared with a prior art routing protocol such as OSFP (Open Shortest Pass First) by which routers mutually exchange routing messages, and the topology information such as addresses of the connected network or the like is grasped and managed.

Also, the network system of the present invention only performs the processing of grasping the topology when the network is originally configurated. Thereafter, only when a partial fault occurs, the lower relay is added, the redundant links of the lower relays are added, or the like, the topology table 271a is updated/added. Accordingly, the update/addition of the topology table 271a has only to be performed to a part of the topology information once a several days-several tens of days, different from the OSFP, which does not make the usual operation complicated.

Also, in the network system of the present invention, there is no need to connect all of the lower relays with the redundant links like a loop. For example, the following connections are possible: (1) connection of at least two lower relays with the redundant links; (2) connection of the lower relays, in a relatively narrow specific area even in a large-scale network, with the redundant links; (3) connection of only the lower relays accommodating users to which redundant/load distribution service are offered with the redundant links. In case of these (1)–(3), the upper relay has only to grasp the topology composed of the lower relays connected with redundant links.

[1-2] Data Communication by Detour Path Upon Fault Occurrence

The operation in case where the communication is performed by detouring the working link where the fault has occurred and by using the redundant link will now be described.

In FIG. 6, the fault detector 250 in the upper relay 200 monitors the presence/absence of the fault in the ports 240a_1, 240b_1–240a_4, and 240b_4 to which the lower relays 300 are connected. There are faults of the ports 240a and 240b, the faults of the ports 310a and 310b of the opposite lower relay 300, the fault of the lower relay 300 itself, the disconnection of the link, an unavailable state due to folding of an optical fiber when the link is an optical fiber, or the like.

In case of the Ethernet (R), the fault detector 250 can determine the above-mentioned faults by the presence/absence of a link integrity signal which can be usually observed if the communication with a link is possible.

It is supposed that the communication with the link 150_1 in FIG. 5 is disabled at this time due to the faults as mentioned above. The fault detector 250 detects the fault and notifies that the communication through the link 150_1 is disabled to the detour path determiner 280, the topology table 271, and the data discriminator 221. The detour path determiner 280 refers the topology table 271 to perform the procedure of determining a detour path not through the link 150_1.

The data discriminator 221 transmits, to the detour frame generator 290, the data frame basically passing through the frame switch/MAC processor 230, the port 240a_1, the link 150_1, and the lower relay 300_1, e.g. the data frame addressed to the enterprise user 191_1 within the frames received through the port 210b from the upper router 100_1 (see FIG. 5).

The detour path determiner 280 retrieves e.g. the shortest detour path to determine the detour route "working link 150_2-lower relay 300_2-redundant link 501-lower relay 300_1". It is to be noted that although the path "working link 150_4-lower relay 300_4-redundant link 504-lower relay 300_1" is also the shortest detour path, the former path is adopted for the detour path in this case.

The detour path determiner 280 prepares the path detour information including the identifiers necessary for passing through the determined detour path to be notified to the detour frame generator 290.

It is to be noted that other determination methods of a detour path will be described later in the embodiments (2)–(4).

When the detour path is the former path, the path detour information is composed of the port identifier "310_2", the port identifier "360e_2", the port identifier "360w_1", and the identifier "300_1" of the lower relay 300_1 to which the destination enterprise user is connected.

The detour frame generator 290 prepares a detour frame 760 in which the path detour information is added to the data frame addressed to the enterprise user.

Figure 12:
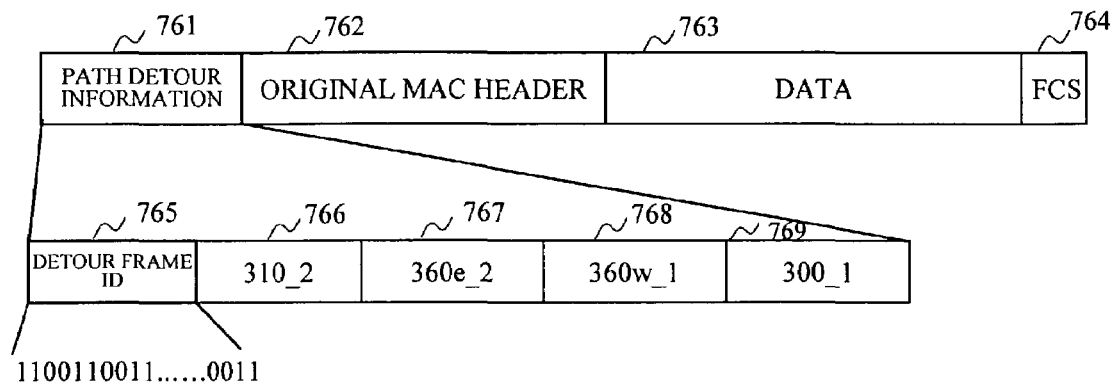
FIG. 12 is a diagram showing a format example of a detour frame in a network system according to the present invention.

FIG. 12 shows a format example of the detour frame 760, which is composed of a path detour information 761, an original MAC header 762 composing the data frame addressed to the enterprise user, data 763, and an FCS 764.

As for the path detour information 761, a detour frame identifier 765 is further added to the above-mentioned path detour information ("port identifier 766"="310_2", "port identifier 767"="360e_2", "port identifier 768"="360w_1", "identifier 769 of the lower relay 300_1"="300_1").

The detour frame identifier 765 indicates that the detour frame 760 is a detour frame. This identifier 765 may be defined as the following examples (1)–(3):

(1) By utilizing that the head 24 bits (company code for indicating a vendor) is unique within a 48-bit MAC address managed by the IEEE (Institute of Electrical and Electronic Engineers) that is a standardization group/academic organization of the LAN technology, a vendor code not yet registered in the IEEE is registered and the vendor code is made a detour frame identifier.

(2) 48 bits where 24 bits which are all "0", for example, are further added to the registered vendor code is made a detour frame identifier.

(3) Instead of a 56-bit preamble (repetition of "01") and an 8-bit SFD "10101011 (binary)" of the usual MAC frame (see FIG. 9), e.g. a bit string "11001100 . . . " as shown in FIG. 12 is added to the head. The detour frame discriminator 321 (see FIG. 7) in the lower relay 300 identifies the detour frame by the difference between the preamble "101010 . . . " of the usual frame and the preamble "11001100 . . . " of the detour frame.

In FIG. 6, the detour path determiner 280 in the upper relay 200 grasps that the detour frame 760 has only to be transmitted from the port 240a_2 in order to transmit the detour frame 760 through the determined detour path. Therefore, the detour path determiner 280 sets the detour frame 760 generated at the detour frame generator 290 to be transmitted from the port 240a_2.

In FIG. 7, the detour frame discriminator 321 in the lower relay 300_2 discriminates whether or not the frame received through the port 310b (=identifier "310_2") is the detour frame 760. If it is not the case, the detour frame discriminator 321 transmits the received frame to the frame switch/MAC processor 330 to be processed as a usual MAC frame.

If it is the case, the detour frame discriminator 321 provides the detour frame 760 to the identifier remover 322, which removes the first identifier "310_2" of the path detour information 761 in the detour frame 760, i.e. the identifier of the port 310b_2 already having been passed. Furthermore, the identifier remover 322 transmits, to the redundant link 501 through the port 360ea, a detour frame 760a in which the identifier "360e_2" is removed, based on the next identifier "360e_2" of the path detour information 761.

Figure 13:
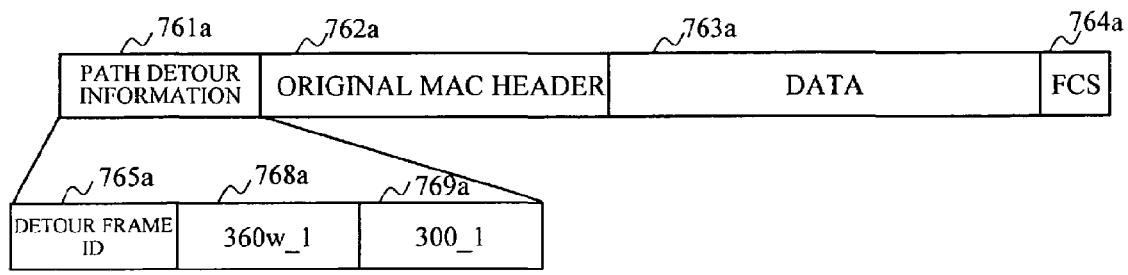
FIG. 13 is a diagram showing an example of a detour frame in a network system according to the present invention.

FIG. 13 shows the detour frame 760a transmitted from the port 360ea. The detour frame 760a is a frame in which the "identifier 766"="310_2" and the "identifier 767"="360e_2" which have become unnecessary are removed from the detour frame 760 shown in FIG. 12.

In the lower relay 300_1 (see FIG. 7), the frame discriminator 351w receives the detour frame 760a (see FIG. 13) through the redundant link 501 (reference numerals of the links shown in FIG. 7 indicate those corresponding to the lower relay 300_2, and different from those of the links in the lower relay 300_1) and the port 360wb (identifier "360w_1").

The identifier generator/holder 370 has already notified the port identifier "360w_1" of its own relay 300_1, the port identifier "360e_1", and the identifier "300_1" of its own relay to the frame discriminators 351w and 351e.

The frame discriminator 351w recognizes, based on the detour frame identifier 765a of the detour frame 760a, that the frame is the detour frame, that the detour frame 760a is a frame received by its own port 360wb, and that its own relay 300_1 is the final receiving lower relay, referring to the port identifier "360w_1" and the identifier "300_1" of the lower relay of the path detour information 761a. Then, the detour frame 760a is provided to the identifier remover 352w.

The identifier remover 352e removes the detour frame identifier 765a, the port identifier "360w_1", and the identifier "300_1" of the lower relay, and returns the detour frame 760a to the data frame (MAC frame) addressed to the original enterprise user to be provided to the frame switch/MAC processor 330.

The frame switch/MAC processor 330 performs the same processing as the usual MAC frame. Thus, the data frame addressed to the enterprise user is notified to the enterprise user through the detour path avoiding the link 150_1 where the fault has occurred.

Opposite Direction Data Communication by Detour Path Upon Fault Occurrence

The data communication by the detour path upon the above mentioned [1-2] fault occurrence is for detouring the data frame from the upper relay 200 to the lower relay 300. However, it is also required to detour the data frame from the lower relay 300 to the upper relay 200 similarly.

In order to achieve this detour, in the upper relay 200 of the present invention, the detour path determiner 280 notifies the information of the detour path to the lower relay 300_1 with the detour path notification frame 780 when the detour path to the lower relay 300_1 is determined.

The lower relay 300_1 transmits the frame toward the upper relay 200 through the detour path based on the received detour path information.

FIG. 14 shows a format example of the detour path notification frame 780, which shows an example of a frame notifying the same detour path as the above-mentioned detour path (port identifier "310_2", port identifier "360e_2", port identifier "360w_1", and identifier "300_1" of the lower relay 300_1).

The detour path notification frame 780 is composed of "detour path notification frame identifier 781", "port identifier 782"="310_2", "port identifier 783"="360e_2", "port identifier 784"="360w_1", "lower relay identifier 785"="300_1", "port identifier 786"="310_2", "port identifier 787"="360e_2", and "port identifier 788"="360w_1".

Thereamong, the port identifiers 786, 787, and 788 are detour path information, in which the identifiers "310_2", "360e_2", and 360w_1" respectively the same as the identifiers set in the port identifiers 782, 783, and 784 are set.

The detour path notification frame identifier 781 may use a bit string, e.g. "11110000 . . . 0011" of 64 bits different from the preamble of the MAC frame, the detour frame identifier, or may register a vendor code, as mentioned above, to be used.

The detour path notification frame 780 is transmitted to the lower relay 300_1 through the detour path while the "port identifier 782", the "port identifier 783", the "port identifier 784", and the "lower relay identifier 785" are being removed, in the same way as the detour frame 760.

The point in which the detour path notification frame 780 is different from the detour frame 760 in this transmission is that the detour path notification frame is recognized by the identifier 781 to be transmitted.

The "port identifier 786"="310_2", the "port identifier 787"="360e_2", and the "port identifier 788"="360w_1" which have not been removed during the communication assume the detour path information.

Namely, in the lower relay 300_1, the frame discriminator 351w receives the detour path notification frame 780, where identifiers "310_2" and "360e_2" are already removed upon reception, detects the detour path notification frame identifier 781 to recognize the detour path notification frame.

The frame discriminator 351w, in the same way as the time when the detour frame 760a is received, determines that its own relay is the final lower relay 300, removes the identifiers "360w_1" and "300_1", and provides the remaining identifiers "310_2", "360e_2", and "360w_1" to the detour path information holder 380 as the detour path information. The detour path information holder 380 holds the detour path information and notifies the same to the fault-timed path detour portion 390 that is a path detour portion upon fault.

Thereafter, in order to transmit the data frame, inputted from the port 340b, toward the upper relay 200 from its own relay 300_1, to the upper relay 200 through the detour path, the fault-timed path detour portion 390 generates the same detour frame as FIG. 12 based on the detour path information to be transmitted from the port 360wa.

The frame discriminator 351e in the lower relay 300_1 recognizes that the detour frame received through the redundant link 501 and the port 360eb is the detour frame, and transmits the same to the identifier remover 352e.

The identifier remover 352e removes the identifiers "360e_2" and "360w_1" having been passed, recognizes the detour frame transmitted to the upper relay 200 with the identifier "310_2", and inputs, to the frame switch/MAC processor 330, the original MAC frame in which the detour frame identifier "11001100 . . . 0011" (see FIG. 12) and the identifier "310_2" are removed from the detour frame.

This MAC frame is transmitted to the destination device through the upper relay 200 based on the usual MAC frame processing operation through the port 310a.

Thus, it becomes possible to transmit the data frame from the upper relay 200 to the lower relay 300, or from the lower relay 300 to the upper relay 200 upon a fault occurrence, by using the same detour path bidirectionally. It is to be noted that the detour path of the down direction may be another path different from the detour path of the upper direction.

The arrangement of the upper relay 200 and the lower relay 300 according to the present invention, in which the detour frame 760 and the detour path notification frame 780 have no influence on the frame switch/MAC processor for switching the usual MAC frames and the transferring processing, will now be described.

When the link 150_1 is unavailable in FIG. 5, the port 310_2 corresponding to the port 310b in FIG. 7 in the lower relay 300_2 receives the usual MAC frame addressed to the general users 192_1–192_q, and the detour frame 760 (see FIG. 12) to which the path detour information is added and which is addressed to the enterprise user 191_1.

In FIG. 7, whether or not the frame inputted to the port 310b of the lower relay 300_2 is a MAC frame is discriminated by the detour frame discriminator 321. Namely, the detour frame discriminator 321 discriminates that the frame is a MAC frame if "101010 . . . 101011 (preamble+SFD)" of 64 bits is added to the frame, and discriminates that the frame is a detour frame if e.g. "110011001100 . . . " is added, thereby separating between the MAC frame and the detour frame.

The MAC frame is inputted to the frame switch/MAC processor 330, and the usual switch (transfer) processing is performed to complete the processing.

The detour frame is not inputted to the frame switch/MAC processor 330. After the identifier which becomes unnecessary is removed at the identifier remover 322, the detour frame is transmitted to the redundant link 501.

In the lower relay 300_1 having received the detour frame through the redundant link 501, the frame discriminator 351w determines whether or not the frame is a detour frame addressed to its own relay (data frame addressed to the enterprise user) or a frame which should be further transferred to the next redundant link 504, based on the path detour information added to the detour frame.

If it is a detour frame addressed to its own relay, the identifier remover 352w removes the identifier added to the detour frame to be transmitted to the frame switch/MAC processor 330 as an original MAC frame. The frame switch/MAC processor 330 transfers the MAC frame to the connection port of the destination enterprise user by the usual switching process to complete the processing.

Thus, immediately after the input to e.g. the port 310_2 of the lower relay 300_2, the usual frame and the detour frame are separated. The usual MAC frame does not flow through the redundant link. Conversely, the frames other than the usual MAC frame are separated so as not to flow through the frame switch/MAC processor 330.

Similarly, the information exchange frame 740 (see FIG. 10) only flows through the redundant link, but not through the frame switch/MAC processor 330.

The notification frame 720 (see FIG. 11) flows through the working link, but not through the frame switch/MAC processor 330.

Thus, the frame of the present invention has no influence on the switching process in the frame switch/MAC processor 330. Also, a type detection of the frames is a detection of a simple bit pattern, does not require a complicated circuit, and can be achieved by an inexpensive and simple circuit arrangement.

[1-4] Operation Upon Fault Recovery

The data communication using a detour path when a fault occurs in the working link has been described heretofore. Now, the operation of the network system of the present invention when the fault in the working link has been recovered will be described.

When a recovery of the link 150_1 where a fault occurred is confirmed, the fault detector 250 in the upper relay 200 (see FIG. 6) notifies the recovery to the data discriminator 221. The data discriminator 221 switches over the transferring destination of the data frame to be passed through the recovered working link from the detour frame generator 290 to the frame switch/MAC processor 230. The frame switch/MAC processor 230 transfers the data frame by usual processing.

Also, when the lower relay 300_1 (see FIG. 7) detects or recognizes by the notification from the upper relay 200 that the fault of the working link 150_1 has been recovered, the fault-timed path detour portion 390 transmits the frame transmitted to the upper relay 200 through the detour path to the upper relay 200 by the usual path through the frame switch/MAC processor 230.

[2] Embodiment (2)

The network arrangement in the embodiment (2) is the same as that shown in FIG. 5. The upper relay 200 and the lower relay 300 are respectively the same as those in the embodiment (1) shown in FIGS. 6 and 7.

FIG. 15 shows a topology table 271b in the embodiment (2). This topology table 271b is different from the topology table 271a in the embodiment (1) shown in FIG. 8 in that a priority is set in the lower relays 300 in a redundant link topology table 271b_2, different from the redundant link topology table 271a_2.

In operation, the embodiment (2) is different from the embodiment (1) as follows: In the upper relay 200 of the embodiment (1), the detour path determiner 280 determines the path in which the number of the lower relays to be passed is the smallest as a detour path, passing through the lower relay 300_2 or lower relay 300_4, based on the topology table 271a. In the presence of plural paths matching a condition, the detour path retrieved first, for example, is selected.

In the presence of plural detour paths, for example, the detour path determiner 280 in the embodiment (2) selects a detour path which passes through the lower relay with a high priority based on the topology table 271b_2. In the same way as the embodiment (1), when the working link 150_1 is unavailable (see FIG. 5), the detour path determiner 280 selects the detour path "port 240_2-port 310_2-port 360e_2-port 360w_1" based on the topology table 271b, since the lower relay 300_2 has a higher priority than the lower relay 300_4.

In this embodiment (2), a higher priority is given to e.g. the lower relay 300 for less delay, which is suitable for a transmission of a multi media stream such as an Internet broadcast sensitive to delay.

[3] Embodiment (3)

The network arrangement (see FIG. 5), the upper relay 200 (see FIG. 6), and the lower relay 300 (see FIG. 7) in the embodiment (3) are the same as those in the embodiment (1).

FIG. 16 shows a topology table 271c in the embodiment (3). This topology table 271c is different from the topology table 271a in the embodiment (1) in that a traffic load monitored by the traffic monitor 260 is set in the lower relays 300 in a usual link topology table 271c_1, different from the table 270a_1.

In operation, the detour path determiner 280 (see FIG. 6), different from that in the embodiment (1), selects a path with less traffic load based on a traffic amount of the table 271c_1.

It is to be noted that for the traffic load of the table 271c_1, the timer 261 may be provided, and the traffic monitor 260 may provide, to the topology table, an average of an available rate per a fixed time for the link bandwidth in its entirety or the like.

[4] Embodiment (4)

The network arrangement (see FIG. 5), the upper relay 200 (see FIG. 6), and the lower relay 300 (see FIG. 7) in the embodiment (4) are the same as those in the embodiment (1).

FIG. 17 shows a topology table 271d in the embodiment (4). This topology table 271d is different from the topology table 271a in the embodiment (1) in that the bandwidth of the working link 150 corresponding to the lower relays 300 is set in the usual link topology table 271d_1, different from the table 271a_1.

In operation, the detour path determiner 280 selects a detour path in order of width of the bandwidth of the link 150 in the table 271d_1.

In the network system (see FIG. 5), there are some cases that the upper relay 200 and the lower relays 300 are connected with the working links 150 whose bandwidths are different from each other. For example, the lower relay 300_4 is connected with the link 150_4 having a broad bandwidth 1000 Mbps since the lower relay 300_4 accommodates many enterprise users (not shown). The lower relay 300_2 is connected with the link 150_2 having a narrower bandwidth 100 Mbps than 1000 Mbps, since the lower relay 300_2 accommodates general users.

The topology table 271d in FIG. 17 shows that the lower relays 300_1–300_4 are connected with the links 150_1–150_4 whose bandwidths are respectively 100 Mbps, 100 Mbps, 100 Mbps, and 1000 Mbps.

When a fault occurs in the link 150_1, for example, the detour path "port 240_4-port 310_4-port 360w_4-port 360e_1" through the link 150_4 having the broad bandwidth is selected.

The method of setting the bandwidth information of the link 150 in the topology table 271d includes a method of e.g. setting the information as an initial value after the network construction, a method of setting the information from a remote network management device through a command line interface (ftp or Telnet), or the like.

[5] Embodiment (5)

Figure 18:
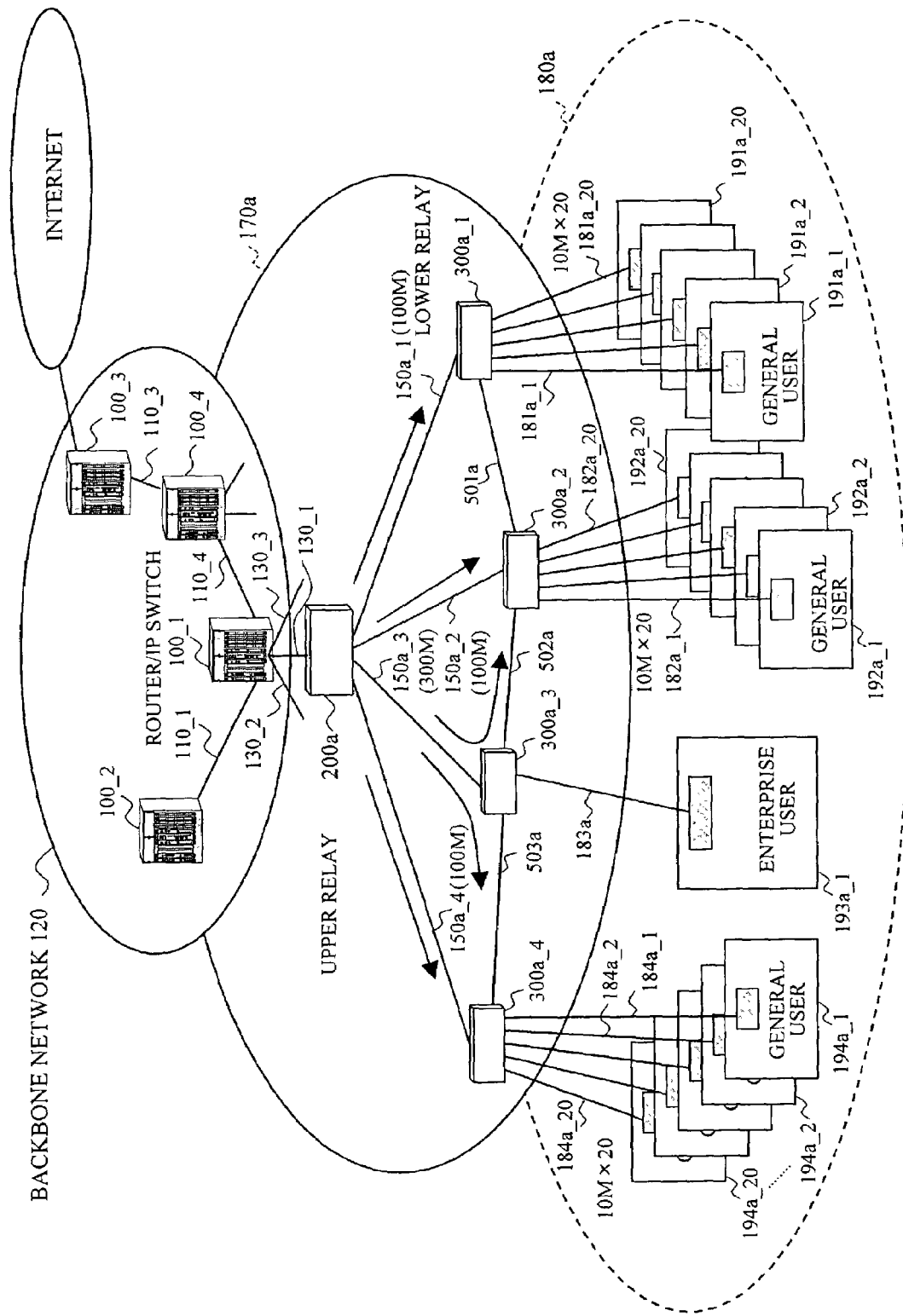
FIG. 18 is a block diagram showing an embodiment (5) of a network system according to the present invention.

FIG. 18 shows an embodiment (5) of the network system according to the present invention. This network system is composed of an upper relay 200a and lower relays 300a_1–300a_4 connected to the upper relay 200a respectively with links 150a_1–150a_4.

Between the lower relays 300a_1 and 300a_2, the lower relays 300a_2 and 300a_3, and the lower relays 300a_3 and 300a_4, the redundant links 501a-503a are respectively connected.

Also, 20 general users 191a_1–191a_20 (hereinafter, occasionally represented by a reference numeral 191a), 20 general users 192a_1–192a_20 (hereinafter, occasionally represented by a reference numeral 192a), a single enterprise user 193a_1, and 20 general users 194a_1–194a_20 (hereinafter, occasionally represented by a reference numeral 194a) are connected to the lower relays 300a_1–300a_4 respectively with links 181a_1–181a_20, links 182a_1–182a_20, a link 183a, and links 184a_1–184a_20.

The carrier contracts with the enterprise user 193a_1 as to the line of 300 Mbps, so that the bandwidth of the link 150a_3 connected to the lower relay 300a_3 is 300 Mbps. The bandwidths of the links 150a_1, 150a_2, and 150a_4 corresponding to the general users 191a, 192a, and 194a are 100 Mbps.

The Internet access by the general users 191a, 192a, and 194a is generally the transferring of an html file and still image upon Web access, downloading of free software, downloading of voice and moving images, receiving of voice and image data of a real-time broadcast or on-demand broadcast, or the like, so that the data amount from the network to the user is overwhelmingly large.

If the carrier accommodates 10 users of 192a_1–192a_10 in e.g. the lower relay 300a_1 and offers the line of 10 Mbps to the users, the bandwidth of 10 Mbps can be guaranteed for the users without fail.

However, the carrier predicts that all of the users 192a_1–192a_10 do not always use the lines, so that it efficiently accommodates the users, and accommodates 10 and more, e.g. 20 users of 191a_1–191a_20, in the lower relay 300a_1, to which the bandwidth of 100 Mbps of the up link 150a_1 can be guaranteed, in order to reduce new plant and equipment cost. The same applies to the number of users to be accommodated in the lower relays 300a_2 and 300a_4.

A general user receives a large amount of traffic during night time. Accordingly, when 20 users of 191a_1–191a_20 are accommodated in e.g. the lower relay 300a_1 with the links 181a_1–181a_20 of 10 Mbps, there is a problem that only an access bandwidth of 5 Mbps is guaranteed for a single user.

In order to solve this problem in the network system, a load distribution may be performed in the embodiment (5).

Namely, there is much traffic in the enterprise user 193a_1 during day time but little during night time. Therefore, during night time, the data discriminating condition setter 222 (see FIG. 6) sets the traffic of the users 194a_1–194a_10 half of the total 20 users of 194a_1–194a_20 accommodated in e.g. the lower relay 300_4 with the addresses of the users 194a_1–194a_10 being made a discriminating condition, and detours the discriminated traffic (100 Mbps at the maximum) through "working link 150a_3-lower relay 300a_3-redundant link 503a".

Similarly, the data discriminating condition setter 222 detours the traffic (100 Mbps at the maximum) addressed to the half of the users accommodated in the lower relays 300a_2 and 300a_1 respectively through paths "working link 150a_3-lower relay 300a_3-redundant link 502a", and "working link 150a_3-lower relay 300a_3-redundant link 502a-lower relay 300a_2-redundant link 501a".

Thus, it becomes possible to guarantee the access bandwidth of 10 Mbps for the general users 191a, 192a, and 194a.

In order to execute the above-mentioned operation, the carrier, when accommodating more than 10 general users in e.g. the lower relay 300, has only to register the MAC address of the user device transmitting the data by using the above-mentioned detour path in the data discriminating condition setter 222 in the upper relay 200.

Also, when a time zone in which the traffic of e.g. the enterprise user 193a_1 occurs relatively frequently is 9:00-21:00 on weekdays, the carrier sets the other time zone in the timer 223 (see FIG. 6). The timer 223 indicates the set time zone to the data discriminating condition setter 222, which distributes the traffic load of the general user by using the above-mentioned detour path.

Thus, it becomes possible to perform the load distribution considering the time zone.

The embodiment of a dynamic fault path detour upon a fault occurrence and an embodiment of a load distribution in the network system of the present invention have been described above.

[6] Embodiment (6)

Figure 19:
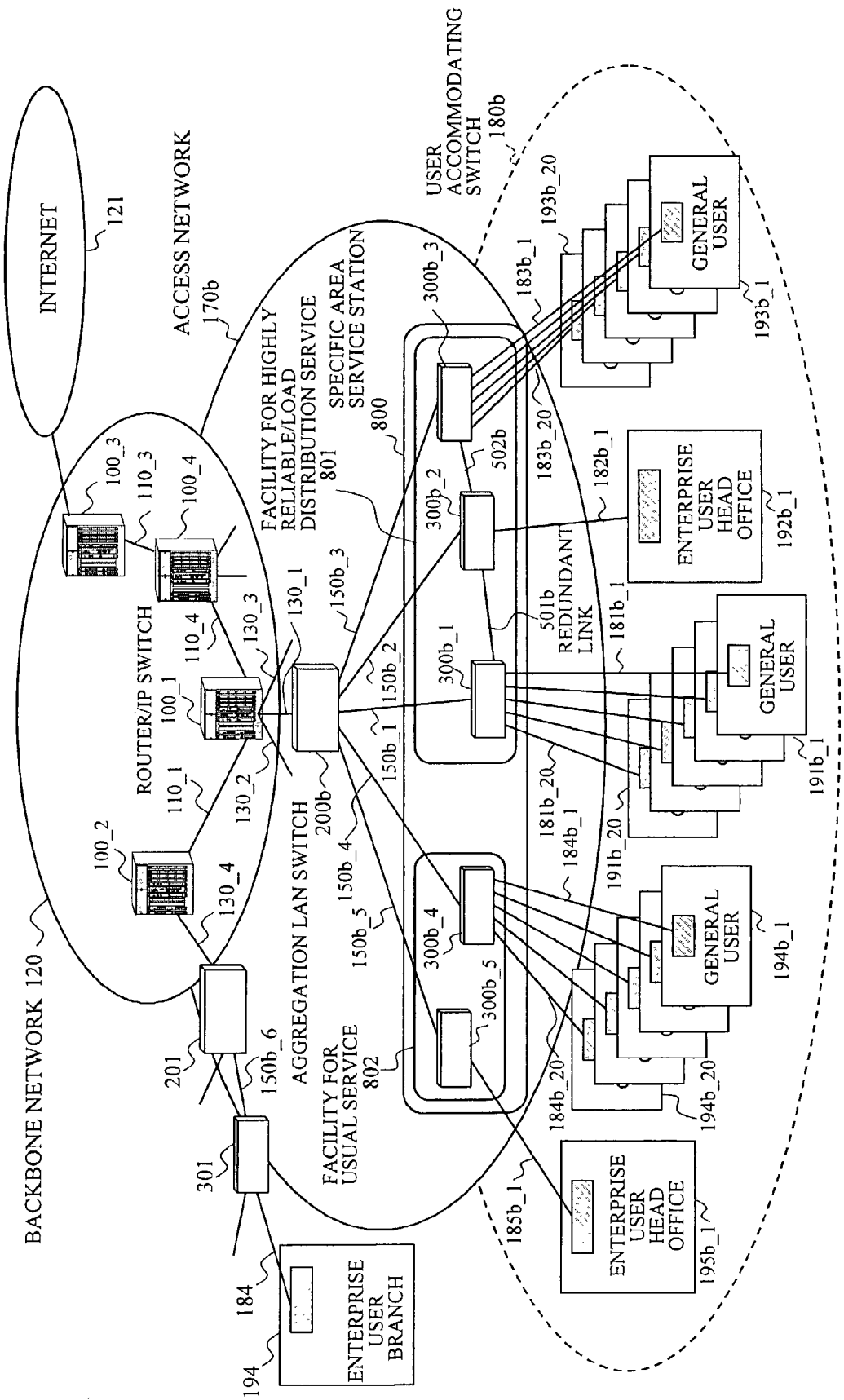
FIG. 19 is a block diagram showing an embodiment (6) of a network system according to the present invention.

FIG. 19 shows an embodiment (6) of the network system according to the present invention. This embodiment (6) shows a service example offered by the network system of the present invention.

An access network (network system of the present invention) 170b of a carrier is composed of an aggregation device (upper relay) 200b and user accommodation switches (lower relays) 300b_1–300b_5 respectively connected to the system 200b with links 150b_1–150b_5. Between the switches 300b_1 and 300b_2, and the switches 300b_2 and 300b_3, the redundant links 501b and 502b are respectively connected.

Also, the switches 300b_1–300b_5 are accommodated in a specific area service station 800. Thereamong, the switches 300b_1–300b_3 are facilities 801 for providing highly reliable/load distribution services, and the switches 300b_4 and 300b_5 are facilities 802 for providing the usual services.

The specific area service station 800 is a facility which sets a device offering an Internet access service and a VPN service for enterprises to a specific area. For example, the specific area service station 800 is set in a substation or the like in the area in case of a service provider of an electric utility group.

When a fault occurs in the connection between the aggregation device 200b and the switch 300b_4 or 300b_5, general users 194b_1–194b_20 (hereinafter, represented by a reference numeral 194b) and an enterprise user 195b_1 can not use the Internet access service or the VPN service for enterprises.

As a result, when the enterprise user 195b_1 daily communicates with the branch 194 or the like in the areas by using the network, the business itself is stopped.

Also, many general users 194b share the up link 150_4, which slows down a response in the time zone when the Internet access is concentrated.

The service received by these general users 194b and the enterprise user 195b_1 is a prior art type service.

On the other hand, the users accommodated in the switches 300b_1–300b_3 can continue the communication by the detour path through the redundant link even when the fault has occurred.

Namely, the highly reliable service without disconnection of the Internet access is offered to general users 191b_1–191b_20, and 193b_1–193b_20 (hereinafter, respectively represented by reference numerals 191b and 193b). The highly reliable service without disconnection of the business communication is offered to an enterprise user 192b_1.

Also, the link 150b_2 is a broad bandwidth link having a bandwidth equal to or more than a bandwidth contracted with the enterprise user 192b_1. The bandwidth guarantee service is offered to the enterprise user 192b_1.

Also, offering a minimum bandwidth guarantee service by using the link 150b_2 which is empty during night time to the general users 191b and 193b can be conceived.

In FIG. 19, it is supposed that the bandwidth of e.g. the links 150b_1 and 150b_3 is 100 Mbps, the bandwidth of links 181b_1–181b_20, and 183b_1–183b_20 (hereinafter, represented by reference numerals 181b and 183b) connecting the general users 191b and 193b is 10 Mbps, and the bandwidth of the up link 150b_2 of the switch 300b_2 accommodating the enterprise user 192b_1 is more than 200 Mbps.

The link 150b_2 without traffic during night time is set in the aggregation LAN switch 200 so as to be used for the traffic of the general users 191b and 193b, thereby distributing the load.

Thus, the carrier can offer a bandwidth guarantee service to 40 users 191b and 193b in total by distributing the bandwidth 400 Mbps in total for all the links 150b_1–150b_3 to the bandwidth 10 Mbps for the access links 181b and 183b.

In this case, the carrier can offer a usual service in which the up links 150b_1 and 150b_3 are shared with many users, and a bandwidth guarantee service which is more expensive than the usual service but guarantees the bandwidth of 10 Mbps.

Figure 20:
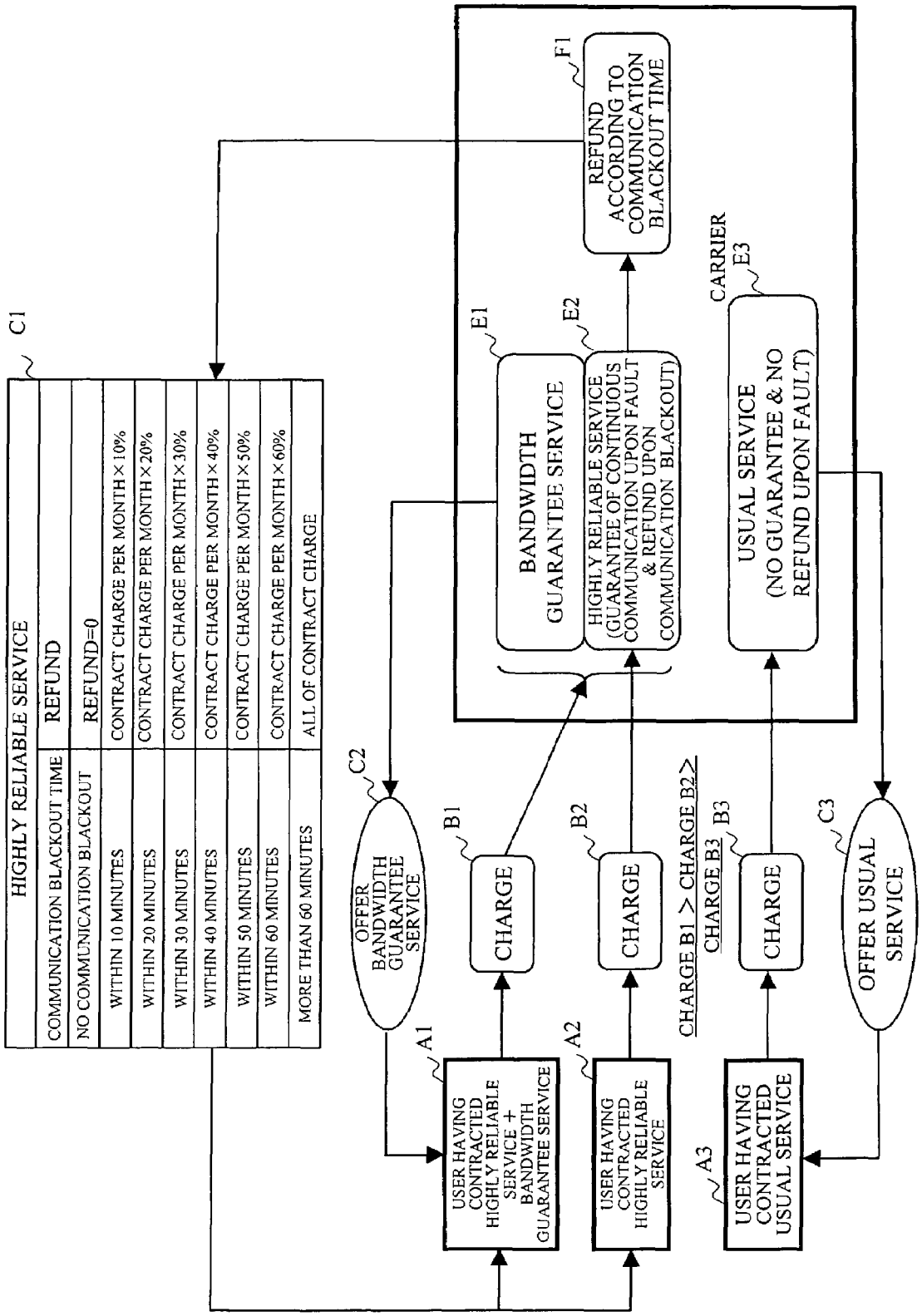
FIG. 20 is a diagram showing an example of a service offered in an embodiment (6) of a network system according to the present invention.
Figure 21:
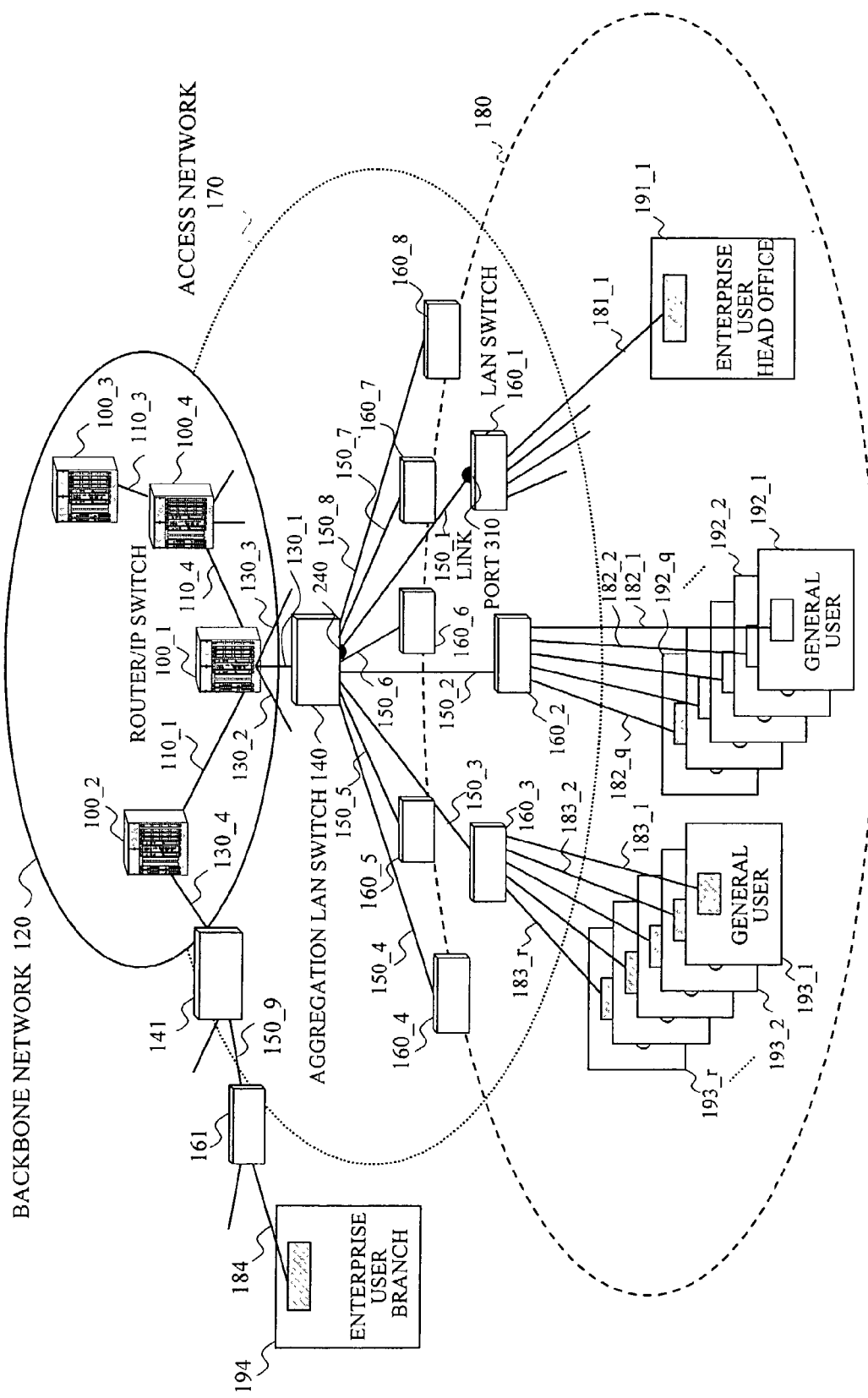
FIG. 21 is a block diagram showing a prior art network system.

FIG. 20 more specifically shows a service system example in the embodiment (6). This service system is composed of a bandwidth guarantee service E1 with a guarantee of a communication bandwidth, a highly reliable service E2 with a guarantee of a continued communication upon a fault and a refund in case of a communication blackout, and a usual service E3 without the guarantee of the continued communication upon the fault or the refund.

Users are divided into a user A1 having contracted the highly reliable service E2 and the bandwidth guarantee service E1 with the carrier, a user A2 having contracted the highly reliable service E2, and a user A3 having contracted the usual service E3.

The users 194b and 195b_1 accommodated in the LAN switches 300_4 and 300_5 shown in FIG. 19 are the users A3 having contracted the usual service. They are offered the usual service E3 by the carrier, and pay a charge B3 for the available contract of the Internet access service and the VPN service. The carrier does not guarantee a prevention of a service stop due to a network fault for the user having contracted the usual service E3.

On the other hand, the users accommodated in the switches 300b_1–300b_3 are the contract users A1 enjoying "highly reliable service C1+bandwidth guarantee service C2",or the contract users A2 enjoying only the highly reliable service C2. The contract users A1 and A2 respectively pay a service charge B1 or B2 to the carrier. The relationship of the charges in the charge system is charge B1>charge B2>charge B3.

The carrier guarantees the prevention of the service stop for the highly reliable service contract users A1 and A2 by using a detour path facility for faults. However, in the event of the service stop, the carrier offers a charge system in which a part of a contracted charge or all of the contract charge is refunded according to e.g. the time of a communication blackout.

When the charge B1 is a fixed contract charge per month, as shown in the highly reliable service C1 in FIG. 20, for example, a serve/charge system can be considered as follows: 10% of the charge per month is refunded by the carrier to the user per 10 minutes of the communication blackout, and all of the charge is refunded in case of more than 1 hour communication blackout.

The offering of the highly reliable service E2 and the example of the bandwidth guarantee service E1 have been described above. However, the service offering system in which the carrier sets the aggregation LAN switch 200 and optionally offers the bandwidth guarantee service E1 is also possible.

Namely, it becomes possible for the carrier to offer the highly reliable service and the bandwidth guarantee service and for the user to select a service according to the preference.

Thus, by the embodiment (6) of the present invention, it becomes possible for the carrier to realize new service and business model, and for the general user and the enterprise user to select a service according to the desired requirements.

As described above, upper and lower relays and a network system according to the present invention are arranged such that the lower relays are connected with redundant links, and communication is performed through the redundant links when a working link is unavailable. Therefore, it becomes possible to continue the communication and to construct a reliable network even when the working link becomes unavailable due to a fault or the like.

Also, when the length of the redundant link (optical fiber) required for the upper and lower relays and the network system of the present invention is compared with the length of the link added in case an aggregation technology which aggregates the prior art plural working links is adopted (or in case a protect link is used for the same path as the working link), the total link (optical fiber) length in the lower relays, in the presence of numerous lower relays, is shorter in the redundant link system than in the prior art protect link system, and the difference becomes larger as the number of lower relays increases.

When the number "s" of LAN switches 300 are set on the circle of "r" radius and the aggregation LAN switch 200 is set in the center of the circle, for example, a necessary redundant link length is="2πr", and a necessary additional link length for an aggregation="sr".

Usually, the number "s" of LAN switches 300 is e.g. 100 or 1000. In this case, the redundant link length≒6× radius "r", 6× radius "r", the additional link length=≒100× radius "r", and 1000× radius "r", respectively. The difference between the redundant link length and the additional link length is extremely large, and it is recognized that the network arrangement by the redundant link is advantageous.

Namely, by the present invention, it becomes possible to reduce the optical fiber length required by the service offering carrier and the construction costs, and to construct the network inexpensively.

Also, the network system of the present invention arranged based on the Ethernet (R) can make the Ethernet (R), which is simple and inexpensive but has no function of reliability, communication means which offer a communication service with reliability.

Accordingly, it becomes possible to offer a network inexpensive, high-speed, and reliable, and a network based on the Ethernet (R) further easier to be managed, for a basic network of a broadband access for a general user and an enterprise, a carrier access network of the IP-VPN for an enterprise, or a wide-area LAN virtual leased line service composing the VPN by the layer 2 switches whose further spread in the future is expected.

Also, offering a reliability (stability) to the most expected FTTH, i.e. the Ethernet (R) using the optical fiber in the broadband service makes a contribution to the spread of the infrastructure of the broadband access.

Also, the network system is arranged such that a detour path determiner uniquely and respectively allocates identifiers to the relays themselves and ports of relays terminating the link, and specifies a detour path based on the identifier, and the detour paths in the relays (LAN switches or the like) do not pass through a MAC processor/switch module. Therefore, the network system can be realized without influence on the MAC processor/switch module or the like which is already made LSI by the prior art LAN switch or the like, and the rise in the prices accompanied with the functional addition of the present invention is not very high.

Also, the upper and lower relays and the network system of the present invention can offer a highly reliable service for the Internet access service, a highly reliable service for a connection service between sites of enterprise users, and a bandwidth guarantee service utilizing a load distribution. The carriers can offer various service menus.

As described above, the effect of the present invention appears in a wide area, and makes a contribution to the spread of the Internet to general users and the spread of the IP-VPN use of enterprises in the future by a highly reliable broadband access service, and an expansion of a demand of the network devices composing the Internet and the IP-VPN.

What we claim is:

1. A network system comprising:
   an upper relay;
   a plurality of lower relays connected to the upper relay with working links; and
   one or more redundant links for mutually connecting the lower relays;
   the upper relay determining a detour path, for the working link, composed of the other working links and the redundant links,
   wherein the upper relay is provided with a topology table for holding working link topology information between its own relay and the lower relays, as well as redundant link topology information between the lower relays, and a detour path determiner for determining the detour path based on the topology table.

2. The network system as claimed in claim 1 wherein identifiers are uniquely and respectively allocated to the lower relays themselves and ports of relays terminating the link, and the topology information is composed of the identifiers.

3. The network system as claimed in claim 2 wherein the lower relay generates the identifier at random.

4. The network system as claimed in claim 2 wherein the lower relay generates the identifier of the port based on a MAC address of the port.

5. The network system as claimed in claim 1 wherein the lower relay makes an identifier of its own relay correspond to an identifier of a port of its own relay connected to the working link for the working link topology information to be notified to the upper relay.

6. The network system as claimed in claim 1 wherein the lower relay makes an identifier of its own relay correspond to identifiers of ports of its own relay and of an adjoining lower relay terminating the redundant link for the redundant link topology information to be notified to the upper relay.

7. The network system as claimed in claim 6 wherein the lower relay exchanges identifiers of ports terminating the redundant link with an adjoining lower relay connected with the redundant link, and generates the redundant link topology information based on the exchanged port identifiers and the identifier of its own relay.

8. The network system as claimed in claim 1 wherein the detour path determiner selects the detour path on which a number of lower relays being passed is smallest.

9. The network system as claimed in claim 1 wherein the upper relay is provided with a table indicating a priority of the lower relay, and the detour path determiner selects the detour path which passes through a lower relay with a high priority based on the table.

10. The network system as claimed in claim 1 wherein the upper relay is provided with a traffic monitor for monitoring a traffic load of each working link, and the detour path determiner determines the detour path based on the traffic load.

11. The network system as claimed in claim 1 wherein the upper relay is provided with a table indicating bandwidth information of each link, and the detour path determiner determines the detour path based on the bandwidth information.

12. The network system as claimed in claim 1 wherein the upper relay is further provided with a traffic destination discriminator for discriminating a frame destination and for selecting either the working link or the detour path based on a result of the discrimination.

13. The network system as claimed in claim 12 wherein the upper relay is further provided with a detour frame generator for generating a detour frame to which an identifier of the lower relay itself designating the detour path or of a port of the lower relay is added to a frame transmitted through the detour path.

14. The network system as claimed in claim 12 wherein the traffic destination discriminator discriminates frames addressed to a user device enjoying a bandwidth guarantee service, and distributes and transmits the frames to the working link or the detour path.

15. The network system as claimed in claim 12 wherein the upper relay is further provided with a fault detector for detecting an unavailable working link, and the traffic destination discriminator transmits a frame not to the unavailable working link but to the detour path.

16. The network system as claimed in claim 15 wherein when the fault detector detects that the unavailable working link has been recovered, the traffic destination discriminator transmits a frame through the recovered working link.

17. The network system as claimed in claim 15 wherein the traffic destination discriminator discriminates a frame addressed to a user device enjoying a highly reliable service to be transmitted to the detour path.

18. The network system as claimed in claim 1 wherein the detour path determiner further generates a detour path notification frame including information of the detour path, and transmits the notification frame to the lower relay terminating the detour path.

19. The network system as claimed in claim 18 wherein the detour path notification frame includes information of a notification path, which transmits the notification frame itself, composed of identifiers of the lower relay which is a destination of the notification frame and of ports to be passed, and the detour path information composed of identifiers of ports to be passed.

20. The network system as claimed in claim 1 wherein the relay comprises a LAN switch or an IP switch.

21. A network system comprising:
an upper relay;
a plurality of lower relays connected to the upper relay with working links; and
one or more redundant links for mutually connecting the lower relays;
the upper relay determining a detour path, for the working link, composed of the other working links and the redundant links,
wherein the lower relay has a traffic destination discriminator for terminating a detour frame or for transferring the detour frame to other lower relays based on an identifier of the lower relay itself or of a port of the lower relay designating the detour path added to a detour frame received from the detour path and wherein the lower relay is further provided with a detour path information holder for holding information of the detour path included in a detour path notification frame from the upper relay, and a path detour portion for transmitting a frame to the detour path in a direction of the upper relay.

22. The network system as claimed in claim 20 wherein the lower relay is further provided with an identifier remover for removing an unnecessary identifier added to the frame.

23. The network system as claimed in claim 21 wherein the path detour portion discriminates frames from a user device enjoying a bandwidth guarantee service, and distributes and transmits the discriminated frames to the working link and the detour path.

24. The network system as claimed in claim 21 wherein when the working link is unavailable, the path detour portion discriminates frames from a user device enjoying a highly reliable service to be transmitted to the detour path.

25. An upper relay comprising:
a plurality of working links connecting its own relay and a plurality of lower relays;
a detour path determiner for determining a detour path, of a single arbitrary working link within the working links, composed of other working links and one or more redundant links mutually connecting the lower relays; and
a topology table for holding working link topology information between its own relay and the lower relays, as well as redundant link topology information between the lower relays, and a detour path determiner for determining the detour path based on the topology table.

26. The upper relay as claimed in claim 25, further comprising a traffic destination discriminator for discriminating a frame destination and for selecting either the working link or the detour path based on a result of the discrimination.

27. The upper relay as claimed in claim 26, further comprising a detour frame generator for generating a detour frame to which an identifier of the lower relay itself designating the detour path or of a port of the lower relay is added to a frame transmitted through the detour path.

28. The upper relay as claimed in claim 26 wherein the traffic destination discriminator discriminates frames addressed to a user device enjoying a bandwidth guarantee service, and distributes and transmits the frames to the working link or the detour path.

29. The upper relay as claimed in claim 26, further comprising a fault detector for detecting an unavailable working link, the traffic destination discriminator transmitting a frame not to the unavailable working link but to the detour path.

30. The upper relay as claimed in claim 29 wherein the traffic destination discriminator discriminates a frame addressed to a user device enjoying a highly reliable service to be transmitted to the detour path.

31. The upper relay as claimed in claim 25 wherein the detour path determiner further generates a detour path notification frame including information of the detour path, and transmits the notification frame to the lower relay terminating the detour path.

32. A lower relay comprising:
a working link connecting its own relay and an upper relay;
a plurality of redundant links connecting its own relay and other lower relays; and
a detour path determiner for determining a detour path, of the working link, including other working links connecting the upper relay and the other lower relays, and the redundant links connecting its own relay and the other lower relays,
wherein working link topology information in which an identifier of its own relay is made correspond to an identifier of a port of its own relay connected to the working link is notified to the upper relay, and redundant link topology information in which an identifier of its own relay is made correspond to identifiers of ports of its own relay and of an adjoining lower relay terminating the redundant link is notified to the upper relay.

33. The lower relay as claimed in claim 32 wherein identifiers of ports terminating the redundant link are exchanged between adjoining lower relays connected with the redundant link, and the redundant link topology information is generated based on the exchanged port identifiers and the identifier of its own relay.

34. The lower relay as claimed in claim 32, further comprising a traffic destination discriminator for terminating a detour frame or for transferring the detour frame to other lower relays based on an identifier of the lower relay itself or of a port of the lower relay designating the detour path added to the detour frame received from the detour path.

35. The lower relay as claimed in claim 34, further comprising a detour path information holder for holding information of the detour path included in a detour path notification frame from the upper relay, and a path detour portion for transmitting a frame to the detour path in a direction of the upper relay.

36. The lower relay as claimed in claim 35 wherein the path detour portion discriminates frames from a user device enjoying a bandwidth guarantee service, and distributes and transmits the discriminated frames to the working link or the detour path.

37. The lower relay as claimed in claim 35 wherein when the working link is unavailable, the path detour portion discriminates frames from a user device enjoying a highly reliable service to be transmitted to the detour path.

* * * * *